(12) United States Patent
Saha et al.

(10) Patent No.: US 11,705,850 B2
(45) Date of Patent: Jul. 18, 2023

(54) ROTATING ELECTRICAL MACHINE CONTROL SYSTEM

(71) Applicant: AISIN CORPORATION, Aichi (JP)

(72) Inventors: Subrata Saha, Kariya (JP); Isao Fujiwara, Kariya (JP)

(73) Assignee: AISIN CORPORATION, Aichi (JP)

( * ) Notice: Subject to any disclaimer, the term of this patent is extended or adjusted under 35 U.S.C. 154(b) by 101 days.

(21) Appl. No.: 17/598,983

(22) PCT Filed: Jun. 17, 2020

(86) PCT No.: PCT/JP2020/023682
§ 371 (c)(1),
(2) Date: Sep. 28, 2021

(87) PCT Pub. No.: WO2020/255988
PCT Pub. Date: Dec. 24, 2020

(65) Prior Publication Data
US 2022/0200508 A1 Jun. 23, 2022

(30) Foreign Application Priority Data

Jun. 21, 2019 (JP) ................................. 2019-115705
Jun. 21, 2019 (JP) ................................. 2019-115706

(51) Int. Cl.
*H02K 27/00* (2006.01)
*H02P 1/24* (2006.01)
(Continued)

(52) U.S. Cl.
CPC ............ *H02P 27/085* (2013.01); *H02P 21/22* (2016.02); *H02P 25/22* (2013.01)

(58) Field of Classification Search
CPC ................................. H02P 27/085; H02P 21/22
(Continued)

(56) References Cited

U.S. PATENT DOCUMENTS

2013/0285591 A1    10/2013 Suzuki
2016/0204728 A1    7/2016 Notohara et al.
(Continued)

FOREIGN PATENT DOCUMENTS

EP        3 293 878 A1    3/2018
JP       2008-193870 A    8/2008
(Continued)

OTHER PUBLICATIONS

Extended European Search Report dated Aug. 11, 2022 in European Application No. 20826943.1.
(Continued)

*Primary Examiner* — Erick D Glass
(74) *Attorney, Agent, or Firm* — Sughrue Mion, PLLC

(57) ABSTRACT

A rotating electrical machine control system that controls an alternating-current rotating electrical machine having two coil sets of an N phase arranged on the same stator core includes a first inverter, a second inverter, and an inverter control device that individually controls the two inverters such that currents of different phases flow through the two coil sets. The inverter control device stops the second inverter and performs switching control of the first inverter to convert electric power between a direct current and an alternating current of an N phase, or performs switching control of the two inverters to convert electric power between a direct current and alternating currents of 2N phases. Switching devices included in the first inverter have a shorter transition time between an off state and an on state and smaller switching loss than switching devices included in the second inverter.

8 Claims, 14 Drawing Sheets

(51) Int. Cl.
 *H02P 27/08* (2006.01)
 *H02P 21/22* (2016.01)
 *H02P 25/22* (2006.01)

(58) Field of Classification Search
 USPC ........................................................ 318/244
 See application file for complete search history.

(56) References Cited

U.S. PATENT DOCUMENTS

| | | | |
|---|---|---|---|
| 2017/0237377 A1* | 8/2017 | Furukawa | H02P 29/028 318/564 |
| 2018/0131306 A1* | 5/2018 | Suzuki | H02P 29/028 |
| 2019/0028053 A1* | 1/2019 | Akutsu | B62D 5/0484 |
| 2019/0260324 A1 | 8/2019 | Kuramitsu et al. | |
| 2021/0257950 A1* | 8/2021 | Taniguchi | H02P 27/08 |

FOREIGN PATENT DOCUMENTS

| | | |
|---|---|---|
| JP | 2009-023790 A | 2/2009 |
| JP | 2010-098808 A | 4/2010 |
| JP | 2010-226899 A | 10/2010 |
| JP | 2011-024377 A | 2/2011 |
| JP | 2011-078230 A | 4/2011 |
| JP | 2012-143100 A | 7/2012 |
| JP | 2017-147840 A | 8/2017 |
| JP | 2018-130007 A | 8/2018 |
| WO | 2017/216959 A1 | 12/2017 |
| WO | 2018/025331 A1 | 2/2018 |
| WO | 2018/037457 A1 | 3/2018 |

OTHER PUBLICATIONS

International Search Report of PCT/JP2020/023682 dated Sep. 1, 2020 [PCT/ISA/210].

* cited by examiner

Counter-electromotive voltage (V)

Counter-electromotive voltage (V)

ROTATING ELECTRICAL MACHINE CONTROL SYSTEM

CROSS REFERENCE TO RELATED APPLICATIONS

This application is a National Stage of International Application No. PCT/JP2020/023682 filed on Jun. 17, 2020, claiming priority based on Japanese Patent Application No. 2019-115706 filed on Jun. 21, 2019 and Japanese Patent Application No. 2019-115705 filed on Jun. 21, 2019, the entire contents of which are incorporated herein by reference.

TECHNICAL FIELD

The present disclosure relates to a rotating electrical machine control system whose control target is an alternating-current rotating electrical machine including a plurality of coil sets.

BACKGROUND ART

JP 2018-130007 A discloses a rotating electrical machine control device (10) that controls a rotating electrical machine (80) including stator windings (180 and 280) of a plurality of systems which are a plurality of coil sets (in the background art, reference signs in parentheses are those in the literature referred to.). The rotating electrical machine control device (10) performs control such that phase currents whose phases are shifted by 30 degrees relative to each other pass through the stator windings (180 and 280) of two systems (referred to as "phase-difference current passage".). When phase-different current passage is performed, compared with a case of not performing phase-difference current passage, output torque improves and also harmonic torque ripple decreases, reducing noise and vibration.

CITATIONS LIST

Patent Literature

Patent Literature 1: JP 2018-130007 A

SUMMARY OF THE DISCLOSURE

Technical Problems

Note, however, that although the literature does not state clearly, when such phase-difference current passage is performed, stator windings of the respective coil sets are to be arranged so as to be adjacent to each other. Thus, mutual inductance between the adjacent stator windings is not negligible. In connection with the mutual inductance, too, the influence of line electromotive force between the adjacent stator windings also increases. Particularly, when the switching frequency of an inverter is low, core loss of the rotating electrical machine increases by both low-frequency current harmonics (e.g., fifth-order harmonics and seventh-order harmonics) and the harmonics of the switching frequency, reducing system efficiency. For example, this problem may be dealt with by increasing the switching frequency of the inverter, but it requires to use switching devices that can handle a higher switching frequency, which may increase system cost.

In view of the above-described background, in a system whose control target is an alternating-current rotating electrical machine including two coil sets, it is desired to improve system efficiency while an increase in system cost is suppressed.

Solutions to Problems

A rotating electrical machine control system that takes into account the above-description is, in one aspect, a rotating electrical machine control system that controls an alternating-current rotating electrical machine having a first coil set of an N phase (N is a natural number) and a second coil set of an N phase arranged on a same stator core, and the rotating electrical machine control system includes a first inverter that is connected to a direct-current power supply and the first coil set to convert electric power between a direct current and an alternating current of an N phase; a second inverter that is connected to the direct-current power supply and the second coil set to convert electric power between a direct current and an alternating current of an N phase; and an inverter control device that generates switching control signals that individually control the first inverter and the second inverter, and controls the first inverter and the second inverter such that currents of different phases flow through the first coil set and the second coil set, and the inverter control device stops the second inverter and performs switching control of the first inverter to convert electric power between a direct current and an alternating current of an N phase, or performs switching control of both of the first inverter and the second inverter to convert electric power between a direct current and alternating currents of 2N phases, and switching devices included in the first inverter have a shorter transition time between an off state and an on state and smaller switching loss than switching devices included in the second inverter.

One of the advantages of a rotating electrical machine including two coil sets is that by providing two inverters for the two coil sets, the load on each inverter is reduced, by which larger alternating currents can flow, increasing the torque of the rotating electrical machine. However, depending on required torque, it is also possible to allow the rotating electrical machine to output the required torque using an alternating current that can be handled by one inverter. When the second inverter is stopped and switching control of the first inverter is performed, since a current is not supplied to the second coil set from the second inverter, core loss caused by mutual inductance between the first coil set and the second coil set is also suppressed. On the other hand, for example, when required torque is high and alternating currents that should be handled by the two inverters are required, alternating currents of 2N phases can flow through the rotating electrical machine, and thus, compared with a case in which an alternating current of an N phase flows through the rotating electrical machine, output torque can be increased. Namely, according to this configuration, it is possible to switch a control mode between control that uses one inverter and control that uses the two inverters, as necessary. In this case, the first inverter that operates alone operates at all times, but the second inverter stops occasionally. When the switching devices included in the first inverter with a higher utilization rate are devices with small switching loss compared with the switching devices included in the second inverter, the loss of the entire system can be reduced. In general, switching devices having such small switching loss are expensive, and thus, are used only in the first inverter which is one of the two inverters, by which an increase in overall system cost can be suppressed. Namely, according to this configuration, a system whose control target is an alternating-current rotating electrical machine including two coil sets can improve system efficiency while suppressing an increase in system cost.

Further features and advantages of the rotating electrical machine control system will become clear from the following description of an embodiment which will be described with reference to drawings.

DESCRIPTION OF EMBODIMENTS

Figure 1:
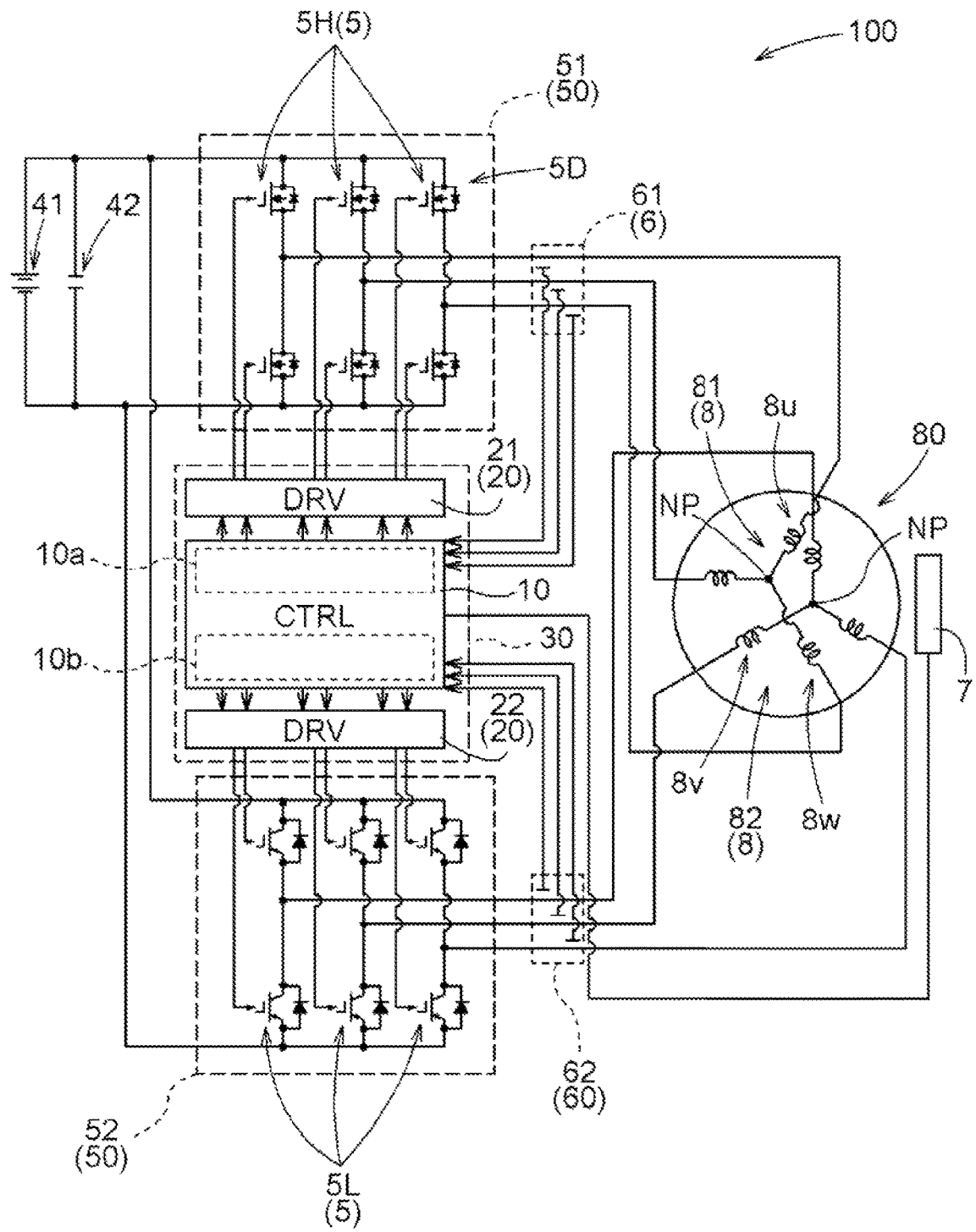
FIG. 1 is a block diagram showing an example of a rotating electrical machine control system.

An embodiment of a rotating electrical machine control system will be described below based on the drawings. The rotating electrical machine control system controls drive of a rotating electrical machine serving as, for example, a vehicle's drive power source. A block diagram of FIG. 1 schematically shows a system configuration of a rotating electrical machine control system 100. A control target of the rotating electrical machine control system 100 is an alternating-current rotating electrical machine 80 including two coil sets 8 (a first coil set 81 and a second coil set 82) of an N phase (N is a natural number). The two coil sets 8 are coil sets 8 having the same specifications (the same configuration and the same electrical specifications), and in the present embodiment, the two coil sets 8 are both coil sets 8 of three phases (N=3).

Figure 15:
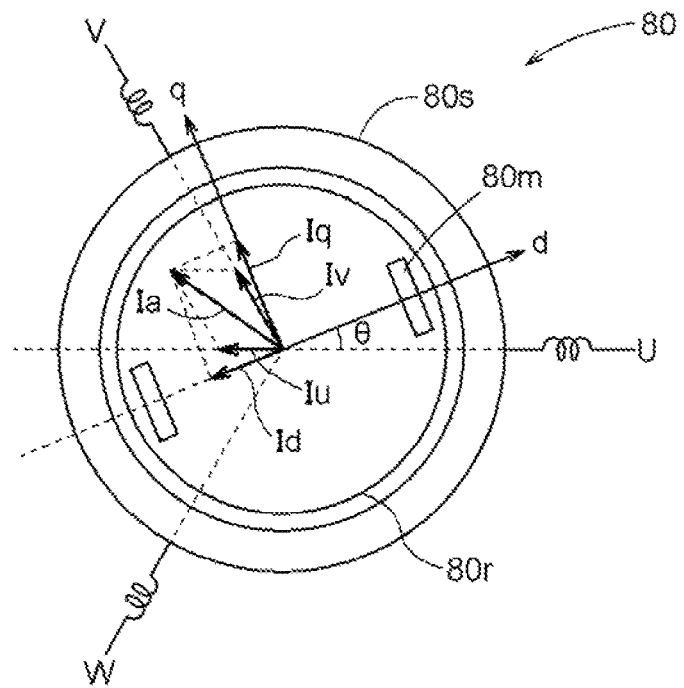
FIG. 15 is an illustrative diagram showing a relationship between a d-q-axis orthogonal vector coordinate system and a three-phase coordinate system.

The rotating electrical machine 80 to be driven by the rotating electrical machine control system 100 is a permanent magnet synchronous motor (PMSM) including a stator 80s having the two coil sets 8 arranged on the same stator core (see FIGS. 2 and 15); and a rotor 80r having permanent magnets 80m disposed in a rotor core (see FIG. 15). In the present embodiment, as shown in FIG. 1, the first coil set 81 and the second coil set 82 each are configured to be star-connected (Y-connected) in which stator coils of three phases (a U-phase coil 8u, a V-phase coil 8v, and a W-phase coil 8w) are short-circuited at a neutral point NP. Note that the rotating electrical machine 80 can function as an electric motor and as a generator.

The rotating electrical machine control system 100 includes two inverters 50 that are connected to a direct-current power supply 41 and their corresponding coil sets 8 to convert electric power between a direct current and alternating currents of N phases. In the present embodiment, as shown in FIG. 1, the rotating electrical machine control system 100 includes a first inverter 51 that is connected to the direct-current power supply 41 and the first coil set 81 to convert electric power between a direct current and alternating currents of N phases (here, three phases); and a second inverter 52 that is connected to the direct-current power supply 41 and the second coil set 82 to convert electric power between a direct current and alternating currents of N phases (here, three phases). That is, the rotating electrical machine control system 100 includes the two inverters 50 for the two coil sets 8. As shown in FIG. 1, the first inverter 51 and the second inverter 52 are inverters 50 having different specifications (they have the same circuit configuration but have different electrical specifications). Note that, as will be described later, switching control of each inverter 50 is performed at different timings such that currents of different phases flow through the first coil set 81 and the second coil set 82. Hence, by the two inverters 50, conversion of electric power between a direct current and alternating currents of 2N phases (here, six phases) is performed between the direct-current power supply 41 and the rotating electrical machine 80.

The direct-current power supply 41 is composed of, for example, a rechargeable secondary battery (battery) such as a lithium-ion battery, or an electric double-layer capacitor. When the rotating electrical machine 80 is a vehicle's drive power source, the direct-current power supply 41 is a high-voltage, large-capacity direct-current power supply and has a rated power supply voltage of, for example, 200 to 400 [V]. On a direct-current side of the inverters 50 there is provided a smoothing capacitor (direct-current link capacitor 42) that smooths out a voltage between positive and negative (direct-current link voltage "Vdc").

Each inverter 50 is configured to include a plurality of switching devices 5. Each switching device 5 includes a freewheeling diode 5D in parallel thereto, with a direction going from negative to positive (a direction going from a lower-stage side to an upper-stage side) being a forward direction. For the switching devices 5, power semiconductor devices are used, e.g., Si-insulated gate bipolar transistors (IGBTs) or Si-metal oxide semiconductor field effect transistors (MOSFETs) which use silicon (Si) as a base material, silicon carbide-metal oxide semiconductor FETs (SiC-MOSFETs), SiC-static induction transistors (SiC-SITs), or SiC-IGBTs which use silicon carbide (SiC) as a base material, or gallium nitride-MOSFETs (GaN-MOSFETs) which use gallium nitride (GaN) as a base material. FIG. 1 exemplifies a mode in which as the switching devices 5, the second inverter 52 uses general Si-IGBTs and the first inverter 51 uses SiC-MOSFETs having a shorter transition time between an off state and an on state and smaller switching loss than the switching devices (Si-IGBTs) included in the second inverter.

Conventionally, Si-IGBTs that use silicon (Si) as a base material are widely used as the switching devices 5 in the inverters 50. In recent years, semiconductor materials such as silicon carbide (SiC) and gallium nitride (GaN) have also started to be put into practical use as base materials of MOSFETs and IGBTs for electric power. Semiconductor materials such as SiC and GaN are higher in basic performance as semiconductor materials than Si, e.g., SiC and GaN have a large band gap (wind-bandgap semiconductors) compared with Si and also have higher dielectric strength than Si. Due to the high dielectric strength, in a high withstand voltage device for electric power (power switching device) that uses SiC or GaN as a base material, the film thickness of a drift layer can be made thinner than that of a device that uses Si as a base material. Since many of the resistive components of the high withstand voltage device for electric power result from the thickness of the drift layer, a high withstand voltage device for electric power that uses SiC or GaN as a base material can implement a device with very low on-resistance per unit area compared with a device that uses Si as a base material.

For a high withstand voltage device for electric power that uses Si as a base material, in order to deal with an increase in on-resistance associated with an increase in withstand voltage, an IGBT (Si-IGBT) having a structure of a bipolar transistor which is a minority carrier device is mainstream. The IGBT is a switching device having a FET structure at an input stage and a bipolar transistor structure at an output stage on one semiconductor device. Note, however, that compared with, for example, a MOSFET, the IGBT has large switching loss, and due to the influence of heat generated as a result of the large switching loss, there is a limit on switching at a high frequency. In a high withstand voltage device for electric power that uses a SiC or GaN as a base material, as described above, the drift layer can be made thin, and thus, even with a MOSFET structure which is a high-speed device structure and is a majority carrier device, an increase in on-resistance associated with an increase in withstand voltage can be suppressed. That is, the high withstand voltage device for electric power that uses a SiC or GaN as a base material can implement a high withstand voltage, low on-resistance, and high-frequency operation.

For example, compared with a Si-IGBT, a SiC-MOSFET can perform higher speed switching and can be used at a higher switching frequency. In addition, a reduction in the loss of the inverters 50 can also be expected. Note, however, that SiC and GaN are expensive compared with Si and may increase the cost of the rotating electrical machine control system 100 including the inverter 50 and the inverter 50.

Each inverter 50 includes a plurality of (here, three) arms, each for one alternating-current phase and including a series circuit of an upper-stage-side switching device 5H and a lower-stage-side switching device 5L. In the present embodiment, a bridge circuit is formed in which one series circuit (arm) is provided for each of the stator coils (8u, 8v, and 8w) corresponding to the U-phase, V-phase, and W-phase of each coil set 8. A midpoint of each arm, i.e., a connecting point between an upper-stage-side switching device 5H and a lower-stage-side switching device 5L, is connected to a corresponding one of the stator coils (8u, 8v, and 8w) corresponding to the U-phase, V-phase, and W-phase of each coil set 8.

As shown in FIG. 1, each inverter 50 is controlled by an inverter drive device 30. The inverter drive device 30 includes an inverter control device 10 (CTRL) and drive circuits 20 (DRV). Though details will be described later with reference to FIG. 19, the inverter control device 10 includes a first control part 10a that controls the first inverter 51; and a second control part 10b that controls the second inverter 52, and independently generates switching control signals for the first inverter 51 and the second inverter 52 to control the first inverter 51 and the second inverter 52. A first drive circuit 21 is provided for the first inverter 51 and the first control part 10a, and a second drive circuit 22 is provided for the second inverter 52 and the second control part 10b.

The inverter control device 10 is constructed using, as a core member, a processor such as a microcomputer. For example, the inverter control device 10 controls the rotating electrical machine 80 through the inverters 50 by performing current feedback control that uses a vector control method, based on target torque (torque instruction T*: see FIG. 19) of the rotating electrical machine 80 which is provided as a request signal from another control device, etc., such as a vehicle control device (not shown) which is one of higher-level control devices. As shown in FIG. 15, in the vector control method, feedback control is performed by coordinate-transforming actual currents (Iu, Iv, and Iw) flowing through the rotating electrical machine into vector components (Id and Iq) on a d-axis indicating a direction of a magnetic field (magnetic flux) generated by the permanent magnets 80m disposed in the rotor 80r and a q-axis indicating a direction orthogonal to the d-axis (a direction advanced by an electrical angle of $\pi/2$ relative to the direction of the magnetic field). Note that "Ia" indicates a combined current obtained by combining vectors. As will be described later with reference to FIG. 19, the inverter drive device 30 (the inverter control device 10) performs feedback control of the rotating electrical machine 80 based on deviation between current instructions (I*) obtained based on a torque instruction T* for the rotating electrical machine 80 and actual currents in a d-q-axis orthogonal vector coordinate system.

As shown in FIG. 1, actual currents flowing through the rotating electrical machine 80 (coil sets 8) are detected by two current sensors 6 (SEN-I), and the inverter control device 10 obtains results of the detection. In the present embodiment, there are provided a first current sensor 61 that detects an alternating current of each phase flowing through the first coil set 81, and a second current sensor 62 that detects an alternating current of each phase flowing through the second coil set 82. Although FIG. 1 exemplifies a mode in which the current sensors 6 detect alternating currents of all phases, for example, in a case of three-phase alternating currents, since three phases are balanced and the sum of their instantaneous values is zero, currents of only two phases may be detected and the remaining one phase may be obtained by the inverter control device 10 performing computation.

In addition, as shown in FIG. 1, the magnetic pole position (electrical angle θ: see FIGS. 15 and 19) at each time point of the rotor 80*r* of the rotating electrical machine 80 and the rotational speed (angular velocity ω (see FIG. 19)) of the rotor 80*r* are detected by a rotation sensor 7 (SEN-R), e.g., a resolver, and the inverter control device 10 obtains results of the detection. The inverter control device 10 performs current feedback control using the results of detection by the current sensors 6 and the rotation sensor 7.

A control terminal (e.g., a gate terminal of an IGBT or a FET) of each switching device 5 included in the inverters 50 is connected to the inverter control device 10 through a corresponding drive circuit 20, and switching control of the switching devices 5 is individually performed. As described above, the inverter control device 10 that generates switching control signals is configured using a microcomputer, etc., as a core, and the operating voltage thereof is, for example, 5 [V], 3.3 [V], or 2.5 [V]. On the other hand, the inverters 50 are, as described above, connected to the direct-current power supply 41 having a rated power supply voltage of, for example, 200 to 400 [V], and a drive signal of, for example, 15 to 20 [V] needs to be inputted to the control terminals of the switching devices 5. The drive circuits 20 improve each of driving capabilities (capabilities to allow a circuit at a subsequent stage to operate, e.g., voltage amplitude and output current) of the switching control signals generated by the inverter control device 10, and relay the switching control signals to the inverters 50.

Figure 2:
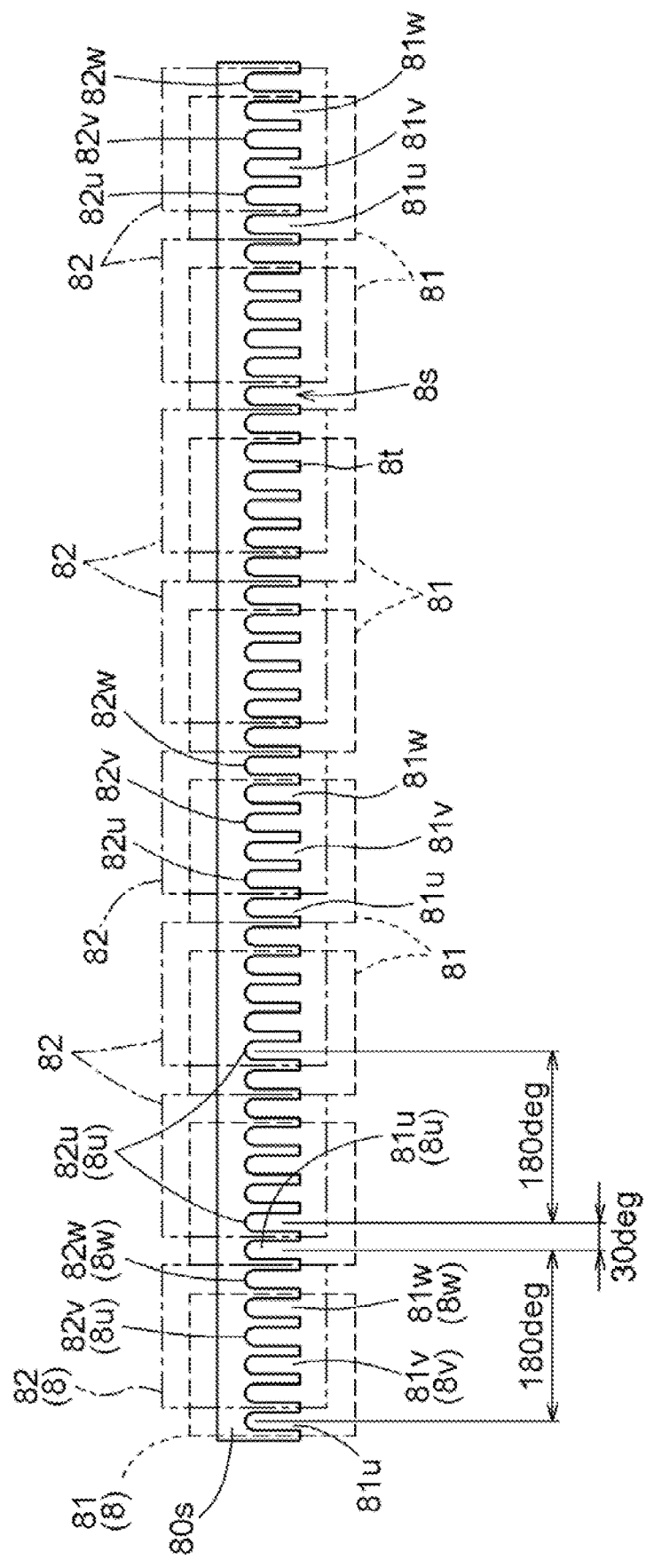
FIG. 2 is a diagram showing an exemplary arrangement of first coil sets and second coil sets.

FIG. 2 shows an exemplary arrangement of stator coils (81*u*, 81*v*, and 81*w*) of first coil sets 81 and stator coils (82*u*, 82*v*, and 82*w*) of second coil sets 82 that are wound around slots 8*s* formed in the stator 80*s* of the rotating electrical machine 80. This corresponds to six-phase (2N-phase) alternating currents such as those described above. As shown in FIG. 2, the stator coils are repeatedly arranged in order of a first U-phase coil 81*u* of a first coil set 81, a second U-phase coil 82*u* of a second coil set 82, a first V-phase coil 81*v* of the first coil set 81, a second V-phase coil 82*v* of the second coil set 82, a first W-phase coil 81*w* of the first coil set 81, and a second W-phase coil 82*w* of the second coil set 82. Since the stator coils of the first coil sets 81 (first system) are adjacent to the stator coils of the second coil sets 82 (second system), there is mutual inductance between the systems.

Coils of the same phase of first coil sets 81 are arranged so as to be separated from each other by an electrical angle of 180 degrees. Likewise, coils of the same phase of second coil sets 82 are also arranged so as to be separated from each other by an electrical angle of 180 degrees. A first coil set 81 and a second coil set 82 are arranged so as to be separated from each other by an electrical angle of 30 degrees. For example, a first U-phase coil 81*u* and a second U-phase coil 82*u*, a first V-phase coil 81*v* and a second V-phase coil 82*v*, and a first W-phase coil 81*w* and a second W-phase coil 82*w* are arranged so as to be separated from each other by an electrical angle of 30 degrees. The inverter control device 10 generates switching control signals that individually control the first inverter 51 and the second inverter 52, and controls the first inverter 51 and the second inverter 52 such that currents of different phases flow through the first coil set 81 and the second coil set 82.

Figure 20:
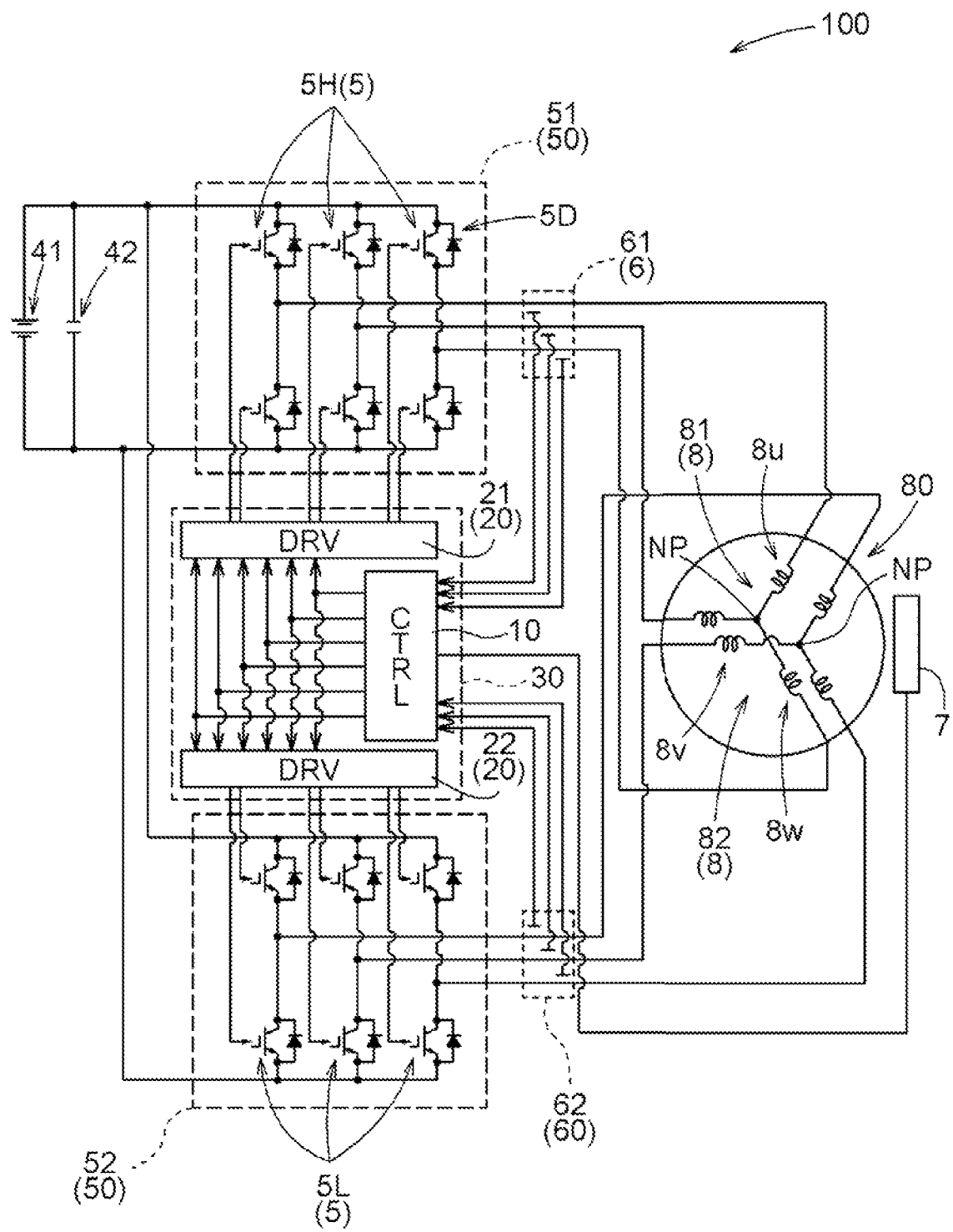
FIG. 20 is a block diagram showing a comparative example of a rotating electrical machine control system.
Figure 21:
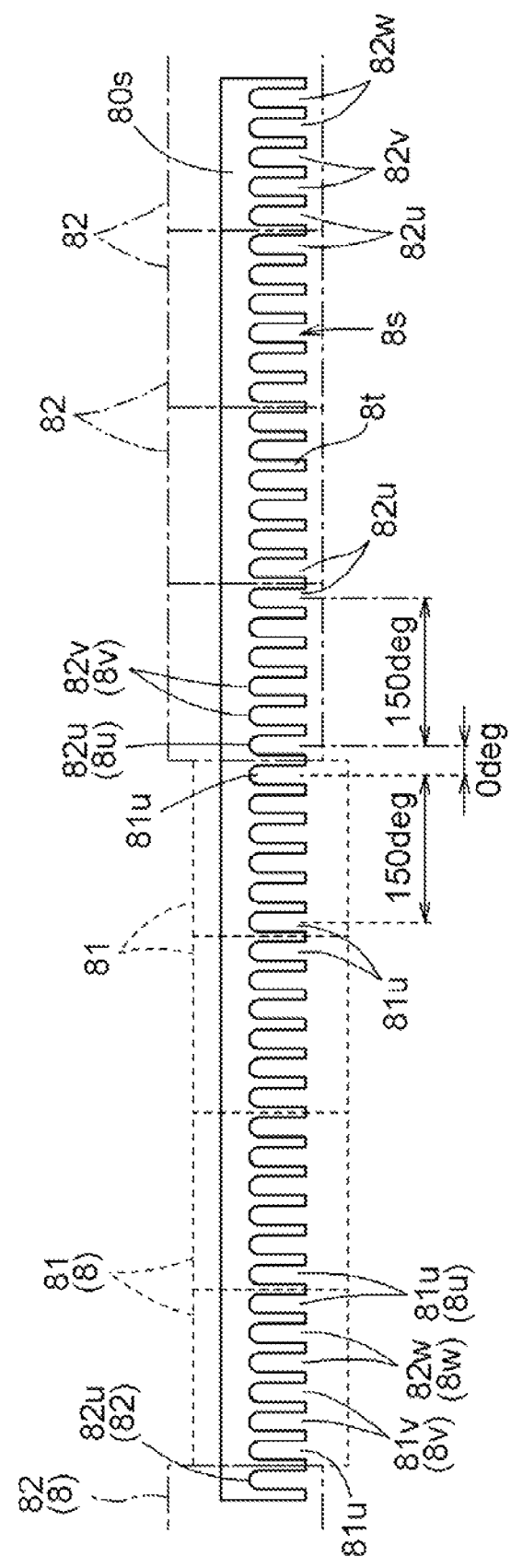
FIG. 21 is a diagram showing an arrangement of first coil sets and second coil sets of a comparative example.

FIG. 20 exemplifies a rotating electrical machine control system 100 of a comparative example to FIG. 1, and FIG. 21 shows an exemplary arrangement of stator coils which is a comparative example to FIG. 2. As shown in FIG. 20, switching control of each inverter 50 is performed at the same timing, and conversion of electric power between a direct current and alternating currents of N phases (here, three phases) is performed between the direct-current power supply 41 and the rotating electrical machine 80. As shown in FIG. 21, a first coil set 81 is repeatedly arranged four times here, with a first U-phase coil 81*u*, two first V-phase coils 81*v*, two first W-phase coils 81*w*, and a first U-phase coil 81*u* being one set, and subsequently, a second coil set 82 is likewise repeatedly arranged four times, with a second U-phase coil 82*u*, two second V-phase coils 82*v*, two second W-phase coils 82*w*, and a second U-phase coil 82*u* being one set. In this case, since the stator coils of the first coil sets 81 (first system) are not adjacent to the stator coils of the second coil sets 82 (second system) except some U phases, there is almost no mutual inductance between the systems.

In the comparative examples shown in FIGS. 20 and 21, currents of the same phase flow through coils of the same phase of the first coil sets 81 and the second coil sets 82. For example, although first U-phase coils 81*u* are arranged so as to be separated from each other by an electrical angle of 180 degrees and second U-phase coils 82*u* are arranged so as to be separated from each other by an electrical angle of 180 degrees, currents of the same phase flow through the first U-phase coils 81*u* and the second U-phase coils 82*u*, resulting in that coils of the same phase of the first coil sets 81 are arranged so as to be separated from each other by an electrical angle of 150 degrees and coils of the same phase of the second coil sets 82 are arranged so as to be separated from each other by an electrical angle of 150 degrees. In addition, currents of the same phase flow through, for example, first U-phase coils 81*u* and second U-phase coils 82*u*, resulting in that a first coil set 81 and a second coil set 82 are arranged at the same electrical angle.

Figure 3:
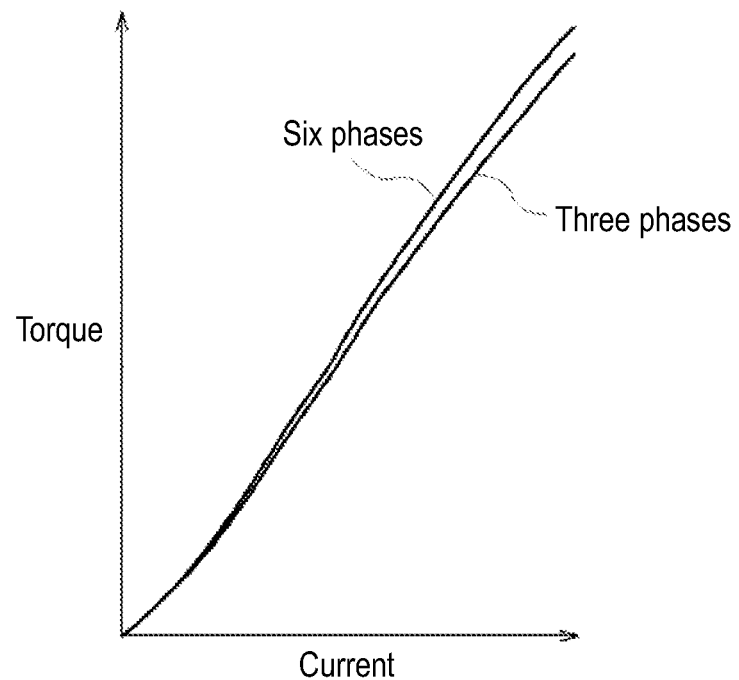
FIG. 3 is a diagram for comparing six-phase alternating currents and three-phase alternating currents in current-torque characteristics.
Figure 4:
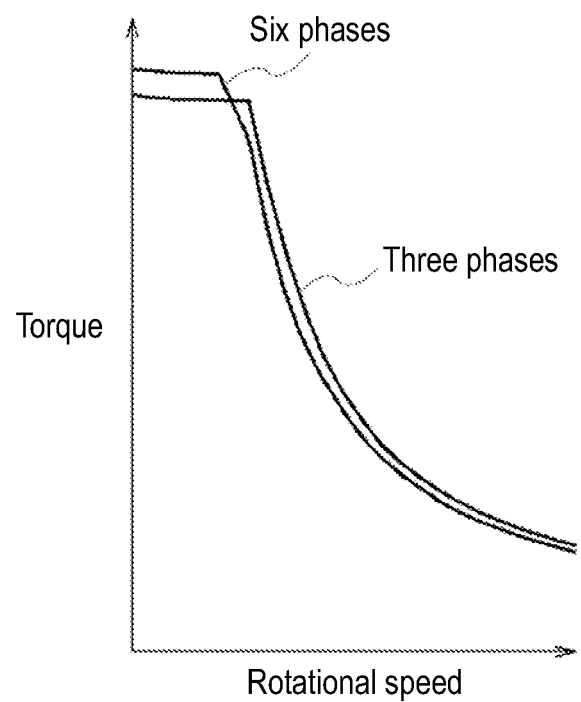
FIG. 4 is a diagram for comparing six-phase alternating currents and three-phase alternating currents in rotational speed-torque characteristics.

As shown in FIG. 3, when the rotating electrical machine 80 is driven by allowing six-phase alternating currents to flow therethrough, compared with a case of driving the rotating electrical machine 80 by allowing three-phase alternating currents to flow therethrough, a larger torque is outputted even if currents have the same effective value. According to experiments and simulations conducted by the inventors, it has been found that with the six-phase alternating currents, torque increases by the order of approximately 4% on a large-current side, compared with the three-phase alternating currents. In a relationship with rotational speed, it has been found that as shown in FIG. 4, in a relatively low rotational speed range, the six-phase alternating currents have an approximately 2% increase in torque, achieving an increase in efficiency, compared with the three-phase alternating currents. As the rotational speed increases, the three-phase alternating currents have a larger torque, but the difference in torque is smaller than that in a low rotational speed range. Note that it is conceivable that the six-phase alternating currents having a smaller torque in a high rotational speed range relates to a counter-electromotive voltage as will be described later with reference to FIGS. 6 to 8.

Figure 5:
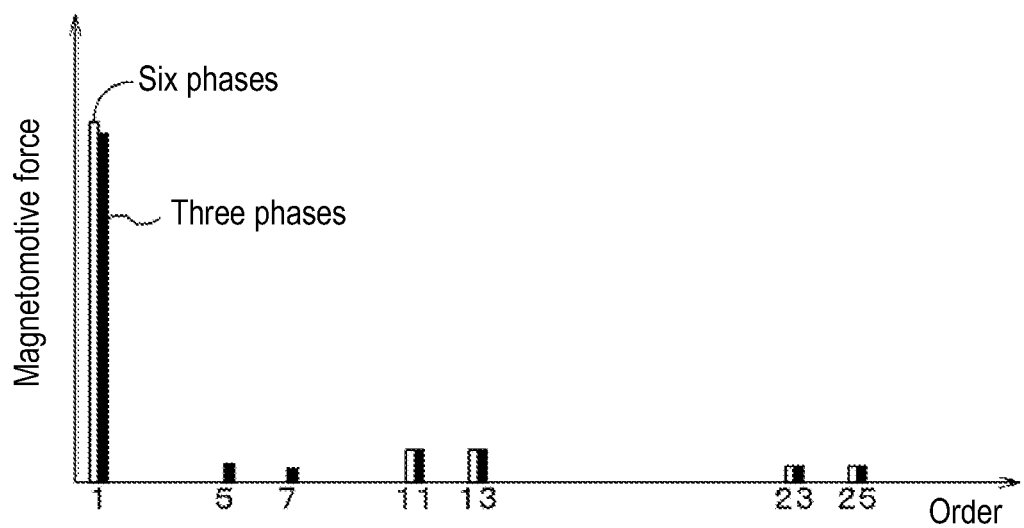
FIG. 5 is a diagram showing a distribution of harmonic content of magnetomotive force.

FIG. 5 shows a distribution of harmonic content of magnetomotive force. Magnetomotive force generated by the six-phase alternating currents has low fifth-order and seventh-order harmonic content compared with magnetomotive force generated by the three-phase alternating currents. By this, core loss is reduced.

Figure 6:
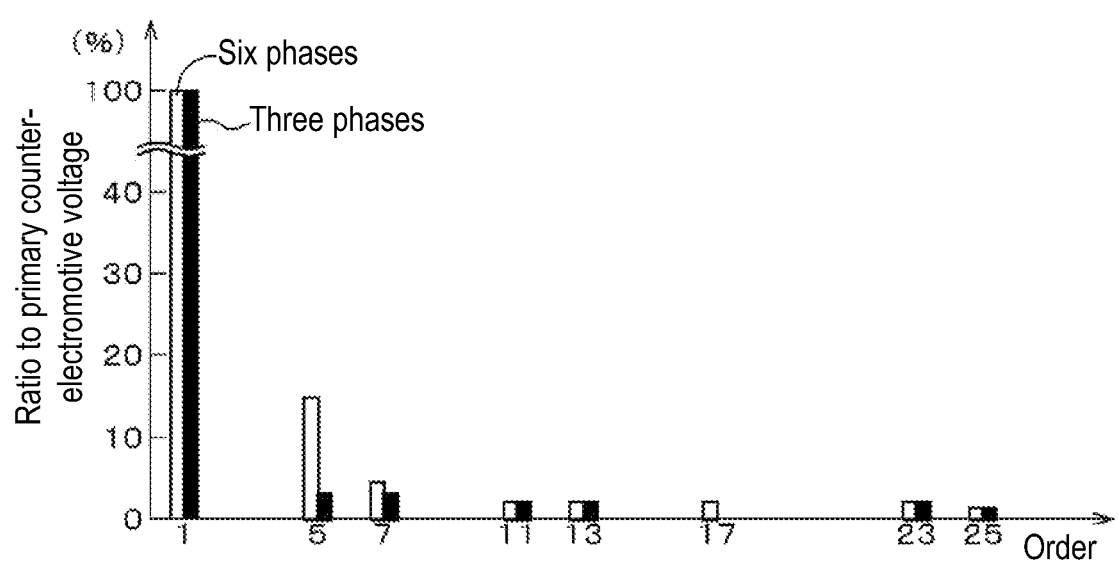
FIG. 6 is a diagram showing the ratio of harmonic content to a primary component of a counter-electromotive voltage.

On the other hand, as described above with reference to FIG. 2, when the rotating electrical machine 80 is driven using six-phase alternating currents, a stator coil of a first coil set 81 and a stator coil of a second coil set 82 through which currents of different phases flow are adjacent to each other. Hence, when the rotating electrical machine 80 is driven using six-phase alternating currents, the influence of a line counter-electromotive voltage increases compared with when the rotating electrical machine 80 is driven using three-phase alternating currents. FIG. 6 shows the ratio of harmonic content to a primary component of a line counter-electromotive voltage. It can be seen that when the rotating electrical machine 80 is driven using six-phase alternating currents, particularly, fifth-order harmonic content and seventh-order harmonic content are high compared with when the rotating electrical machine 80 is driven using three-phase alternating currents.

Figure 7:
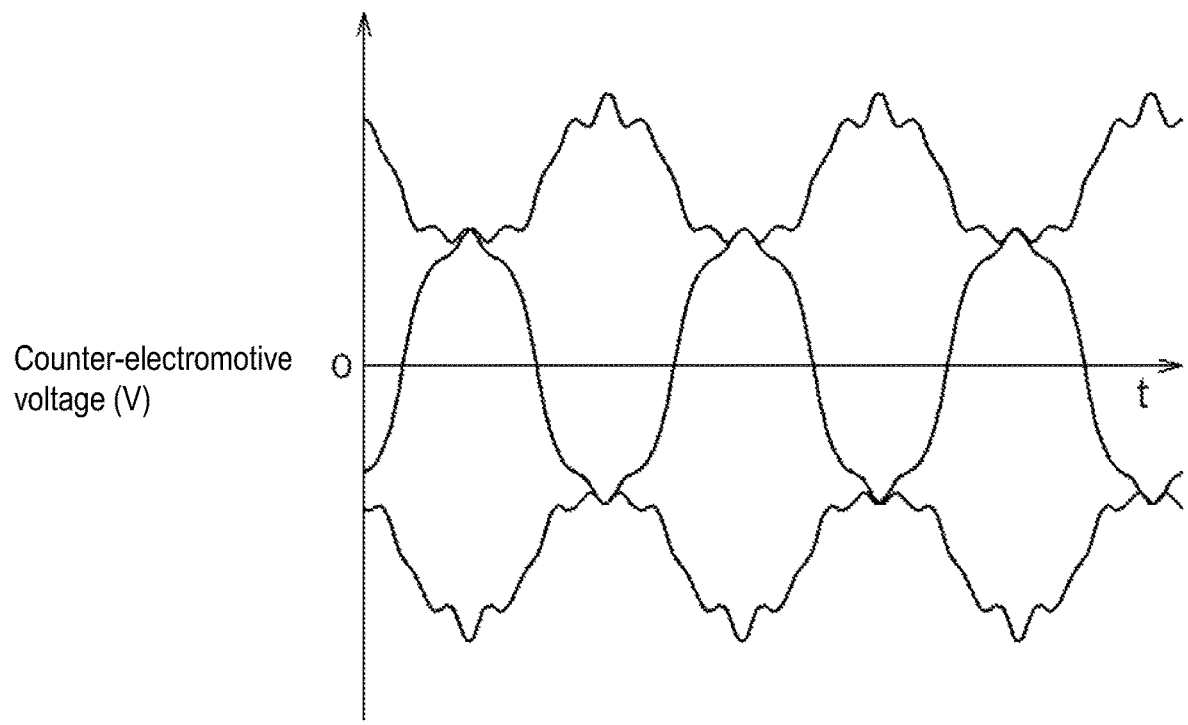
FIG. 7 is a waveform diagram showing an example of a counter-electromotive voltage with six-phase alternating currents.
Figure 8:
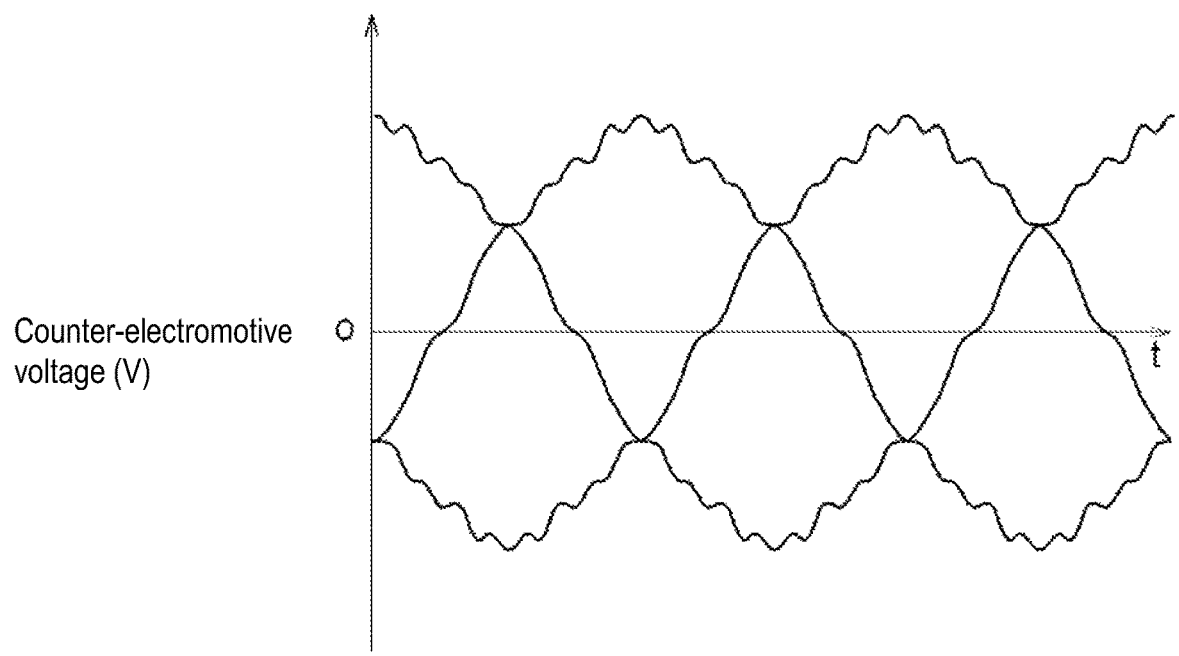
FIG. 8 is a waveform diagram showing an example of a counter-electromotive voltage with three-phase alternating currents.

A waveform diagram of FIG. 7 shows an example of a counter-electromotive voltage for when the rotating electrical machine 80 is driven using six-phase alternating currents, and a waveform diagram of FIG. 8 shows an example of a counter-electromotive voltage for when the rotating electrical machine 80 is driven using three-phase alternating currents. When the rotating electrical machine 80 is driven using six-phase alternating currents, due to the fifth-order harmonic content and the seventh-order harmonic content such as those described above, waveform distortion in counter-electromotive voltage is large compared with when the rotating electrical machine 80 is driven using three-phase alternating currents. As described above, in the configuration of stator coils of the present embodiment, since the stator coils of the first coil sets 81 (first system) are adjacent to the stator coils of the second coil sets 82 (second system), there is mutual inductance between the systems. The mutual inductance is a cause of waveform distortion in counter-electromotive voltage. The distortion is harmonic content and causes electromagnetic noise or audible noise.

The following expression (1) shows a three-phase voltage equation of the first coil set 81 and expression (2) shows a three-phase voltage equation of the second coil set 82. In addition, the following expression (3) shows a two-phase voltage equation of the first coil set 81 and expression (4) shows a two-phase voltage equation of the second coil set 82. In the expressions, the subscripts "u, v, and w" indicate the U-phase, the V-phase, and the W-phase, respectively, the subscripts "d and q" indicate the d-axis and the q-axis, respectively, and the subscript "a" indicates all (combination of three phases) of each of the first coil set 81 and the second coil set 82. "R" indicates the resistive component of the coil set 8, "L" indicates the self-inductance of the stator coil of each phase (8*u*, 8*v*, or 8*w*), "M" indicates the mutual inductance, and "$MI_f$" indicates the coefficient of electromotive force (torque coefficient). "p" is the differential operator.

[Expression 1]

$$\begin{bmatrix} V_{u1ph} \\ V_{v1ph} \\ V_{w1ph} \end{bmatrix} = R_a \begin{bmatrix} i_{u1ph} \\ i_{v1ph} \\ i_{w1ph} \end{bmatrix} + p \begin{bmatrix} L_{u1} & M_{u1v1} & M_{u1w1} \\ M_{v1u1} & L_{v1} & M_{v1w1} \\ M_{w1u1} & M_{w1v1} & L_{w1} \end{bmatrix} \begin{bmatrix} i_{u1ph} \\ i_{v1ph} \\ i_{w1ph} \end{bmatrix} + \\ p \begin{bmatrix} M_{u1u2} & M_{u1v2} & M_{u1w2} \\ M_{v1u2} & M_{v1v2} & M_{v1w2} \\ M_{w1u2} & M_{w1v2} & M_{w1w2} \end{bmatrix} \begin{bmatrix} i_{u2ph} \\ i_{v2ph} \\ i_{w2ph} \end{bmatrix} + \begin{bmatrix} E_{u1} \\ E_{v1} \\ E_{w1} \end{bmatrix} \quad (1)$$

[Expression 2]

$$\begin{bmatrix} V_{u2ph} \\ V_{v2ph} \\ V_{w2ph} \end{bmatrix} = R_a \begin{bmatrix} i_{u2ph} \\ i_{v2ph} \\ i_{w2ph} \end{bmatrix} + p \begin{bmatrix} M_{u2u1} & M_{u2v1} & M_{u2w1} \\ M_{v2u1} & M_{v2v1} & M_{v2w1} \\ M_{w2u1} & M_{w2v1} & M_{w2w1} \end{bmatrix} \begin{bmatrix} i_{u1ph} \\ i_{v1ph} \\ i_{w1ph} \end{bmatrix} + \\ p \begin{bmatrix} L_{u2} & M_{u2v2} & M_{u2w2} \\ M_{v2u2} & L_{v2} & M_{v2w2} \\ M_{w2u2} & M_{w2v2} & L_{w2} \end{bmatrix} \begin{bmatrix} i_{u2ph} \\ i_{v2ph} \\ i_{w2ph} \end{bmatrix} + \begin{bmatrix} E_{u2} \\ E_{v2} \\ E_{w2} \end{bmatrix} \quad (2)$$

[Expression 3]

$$\begin{bmatrix} V_{d1} \\ V_{q1} \end{bmatrix} = R_a \begin{bmatrix} i_{d1} \\ i_{q1} \end{bmatrix} + \begin{bmatrix} pL_{d1} & -\omega L_{q1} \\ \omega L_{d1} & pL_{q1} \end{bmatrix} \begin{bmatrix} i_{d1} \\ i_{q1} \end{bmatrix} + \\ \begin{bmatrix} pM_{d12} & -\omega M_{q12} \\ \omega M_{d12} & pM_{q12} \end{bmatrix} \begin{bmatrix} i_{d2} \\ i_{q2} \end{bmatrix} + \omega \cdot MI_f \begin{bmatrix} 0 \\ 1 \end{bmatrix} \quad (3)$$

[Expression 4]

$$\begin{bmatrix} V_{d2} \\ V_{q2} \end{bmatrix} = R_a \begin{bmatrix} i_{d2} \\ i_{q2} \end{bmatrix} + \begin{bmatrix} pL_{d2} & -\omega L_{q2} \\ \omega L_{d2} & pL_{q2} \end{bmatrix} \begin{bmatrix} i_{d2} \\ i_{q2} \end{bmatrix} + \\ \begin{bmatrix} pM_{d21} & -\omega M_{q21} \\ \omega M_{d21} & pM_{q21} \end{bmatrix} \begin{bmatrix} i_{d1} \\ i_{q1} \end{bmatrix} + \omega \cdot MI_f \begin{bmatrix} 0 \\ 1 \end{bmatrix} \quad (4)$$

Figure 9:
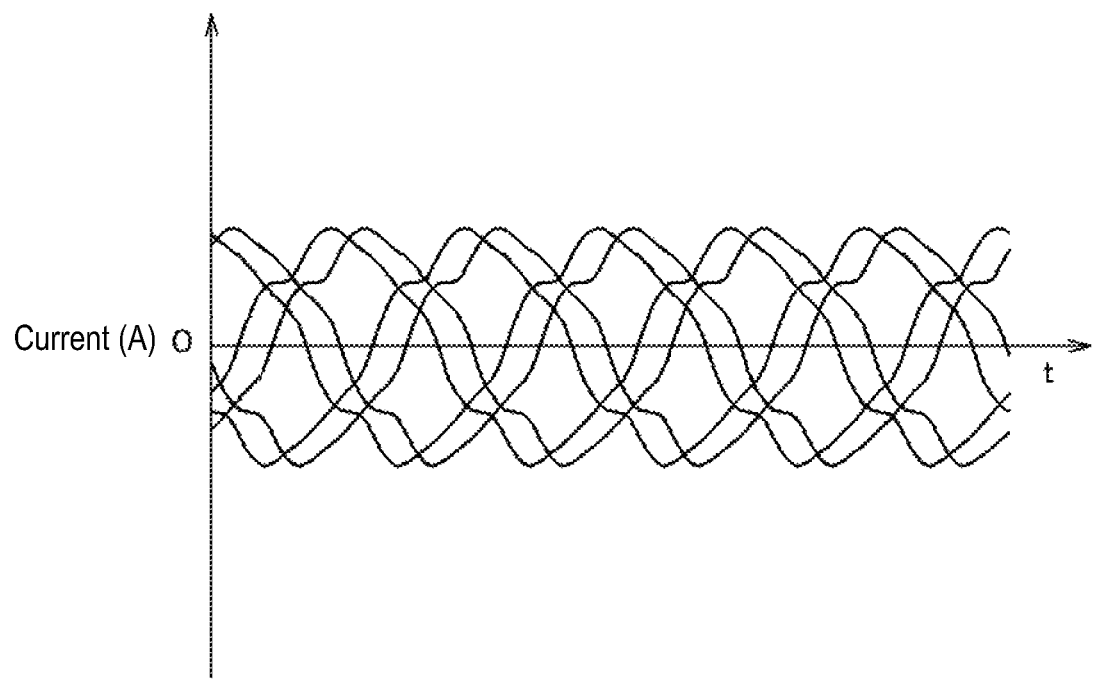
FIG. 9 is a waveform diagram showing an example of current waveforms of six-phase alternating currents.

Though details will be described later with reference to FIG. 19, the inverter control device 10 performs switching control of the inverters 50 by performing current feedback control based on the voltage equations of the above-described expressions (1) to (4). FIG. 9 shows an example of six-phase current waveforms generated by control performed by the inverter control device 10. In the current feedback control, when gain in the feedback control is increased by increasing the cut-off frequency of the inverter control device 10 (current control parts 12 which will be described later (see FIG. 19)), a target (instruction) is reached quickly in principle. However, when there is a disturbance factor in a feedback loop that results from mutual inductance, etc., if the feedback gain is increased by increasing the cut-off frequency, then the control may not converge and current control may not be able to be performed. Waveforms shown in FIG. 10 exemplify a state in which control is not converged.

Figure 10:
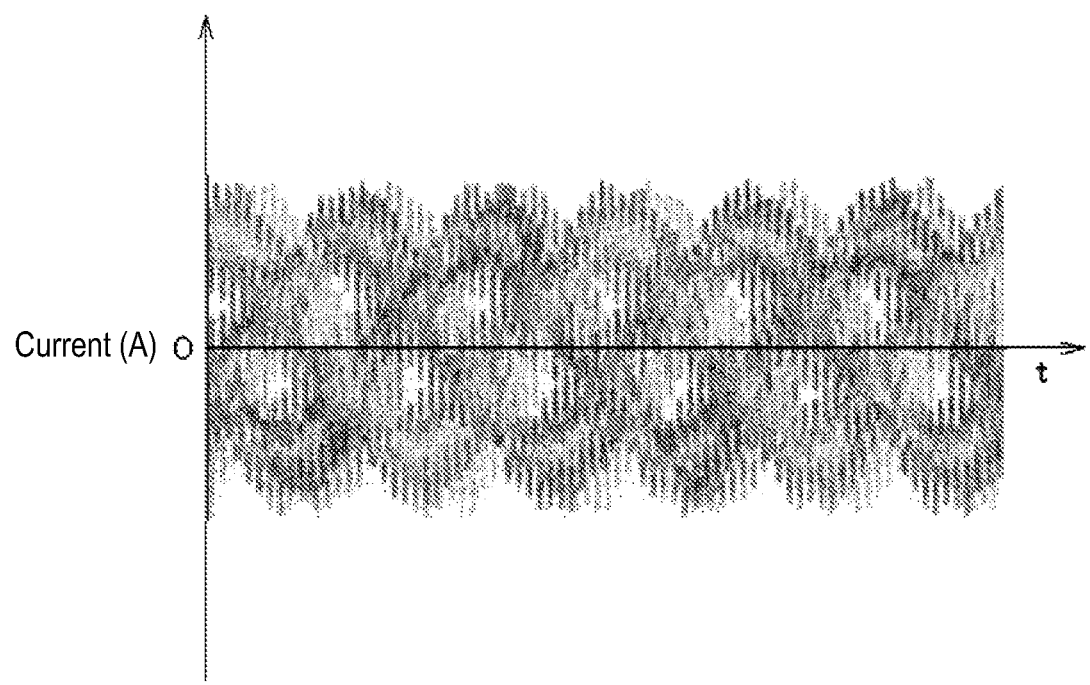
FIG. 10 is a waveform diagram showing an example of current waveforms of six-phase alternating currents.
Figure 11:
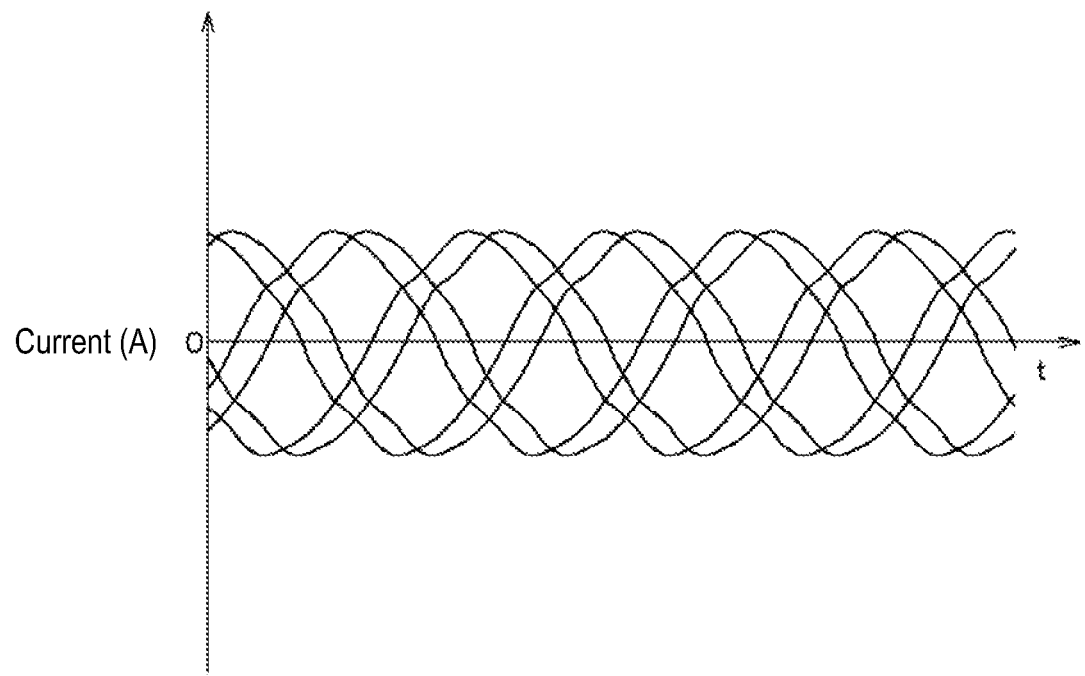
FIG. 11 is a waveform diagram showing an example of current waveforms of six-phase alternating currents.

This can be improved by increasing the modulation frequency (carrier frequency) of the inverter control device 10 (modulating parts 14 which will be described later (see FIG. 19)). For example, when the modulation frequency is increased in a state in which the feedback gain is increased by increasing the cut-off frequency (a state in which the waveforms of FIG. 10 are outputted), control converges and alternating-current waveforms are stabilized like waveforms shown in FIG. 11. The waveforms of FIG. 11 with a high modulation frequency also have smaller distortion than the waveforms of FIG. 9 with a low cut-off frequency and a low feedback gain. The waveforms of FIG. 11 have a modulation frequency that is about twice that of the waveforms of FIGS. 9 and 10.

That is, by performing modulation at a higher modulation frequency, alternating currents with small distortion can flow through the coil sets 8. Note, however, that in order to perform switching control of the inverters 50 using switching control signals modulated at a high modulation frequency, there is a need to form the inverters 50 using switching devices 5 that handle switching at a high frequency. For example, in a mode exemplified in FIG. 1, SiC-MOSFETs are used as the switching devices 5 included in the first inverter 51, but as exemplified in FIG. 17 which is a comparative example, by using SiC-MOSFETs also as the switching devices 5 included in the second inverter 52, a high modulation frequency can be handled. However, as described above, since switching devices 5 such as SiC-MOSFETs are high in component unit cost, it leads to an increase in the cost of the rotating electrical machine control system 100.

Figure 12:
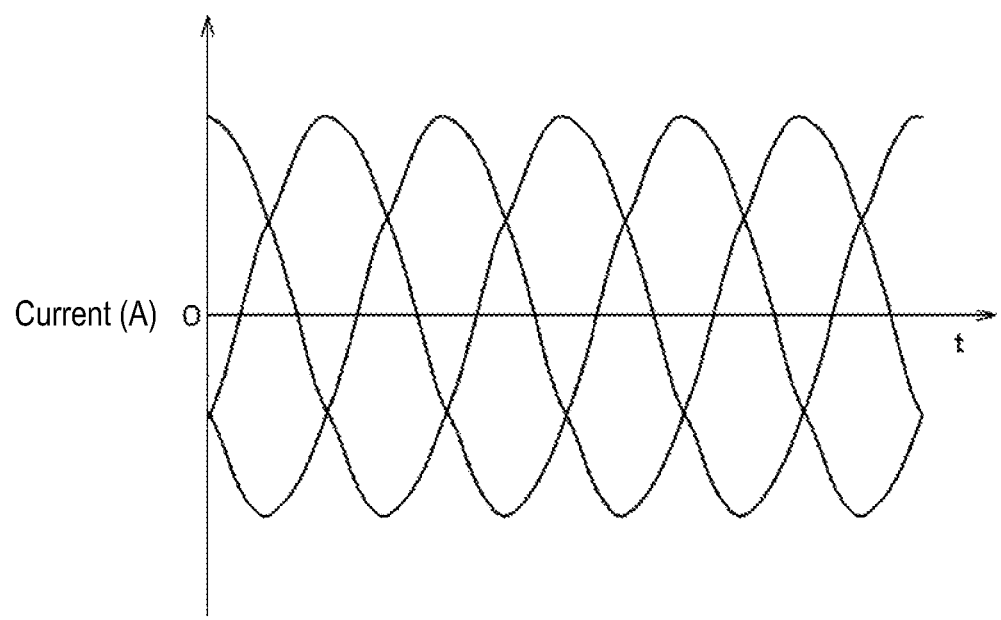
FIG. 12 is a waveform diagram showing an example of current waveforms of three-phase alternating currents for one coil set.

Meanwhile, as described above with reference to FIGS. 7 and 8, since the three-phase alternating currents have small distortion in counter-electromotive voltage compared with the six-phase alternating currents, the three-phase alternating currents also have small distortion in alternating-current waveforms. Thus, when three-phase alternating currents are allowed to pass through only one coil set 8 using only one inverter 50, even when the feedback gain is increased by increasing the cut-off frequency and the modulation frequency is maintained, as exemplified in FIG. 12, feedback control can be converted. Note, however, that since currents that flow through the first coil set 81 and the second coil set 82 flow through one coil set 8 (e.g., only the first coil set 81), the effective value of alternating currents becomes double. Thus, such a control mode can be selected when required torque of the rotating electrical machine 80 is small and it is sufficient to use only alternating currents that can be handled by one coil set 8 and one inverter 50. That is, considering the fact that the effective value of alternating currents flowing through one coil set 8 becomes double, in an operating range of the rotating electrical machine 80 with a relatively small effective value of alternating currents, distortion in alternating-current waveforms can be reduced by allowing three-phase alternating currents to flow using one coil set 8.

Figure 13:
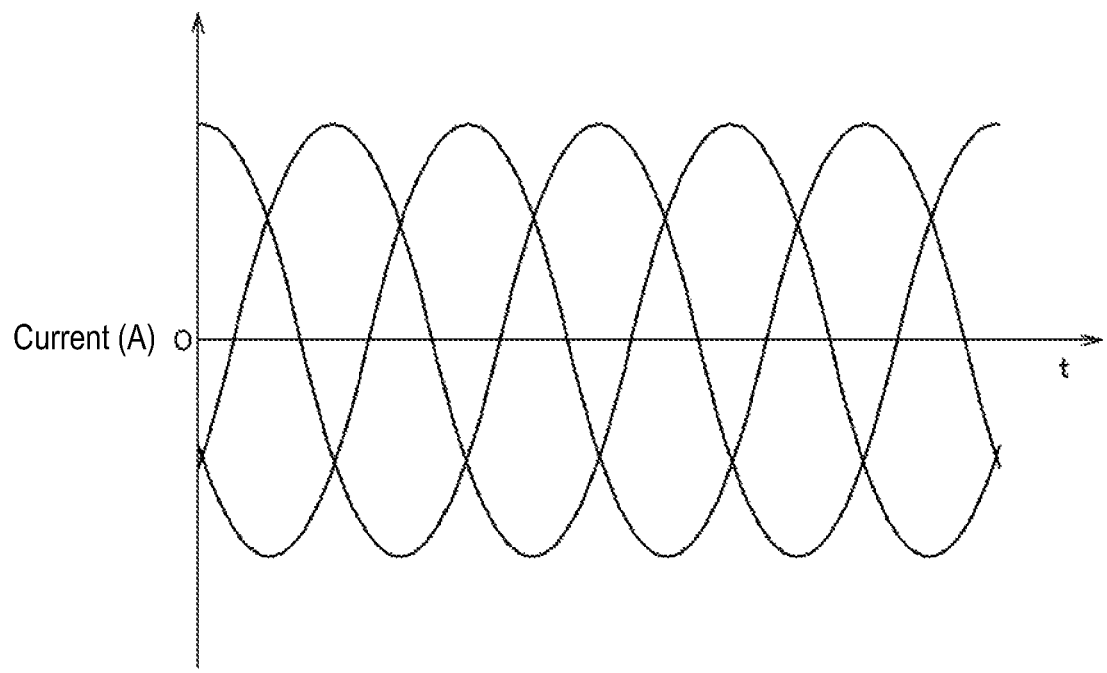
FIG. 13 is a waveform diagram showing an example of current waveforms of three-phase alternating currents for one coil set.
Figure 17:
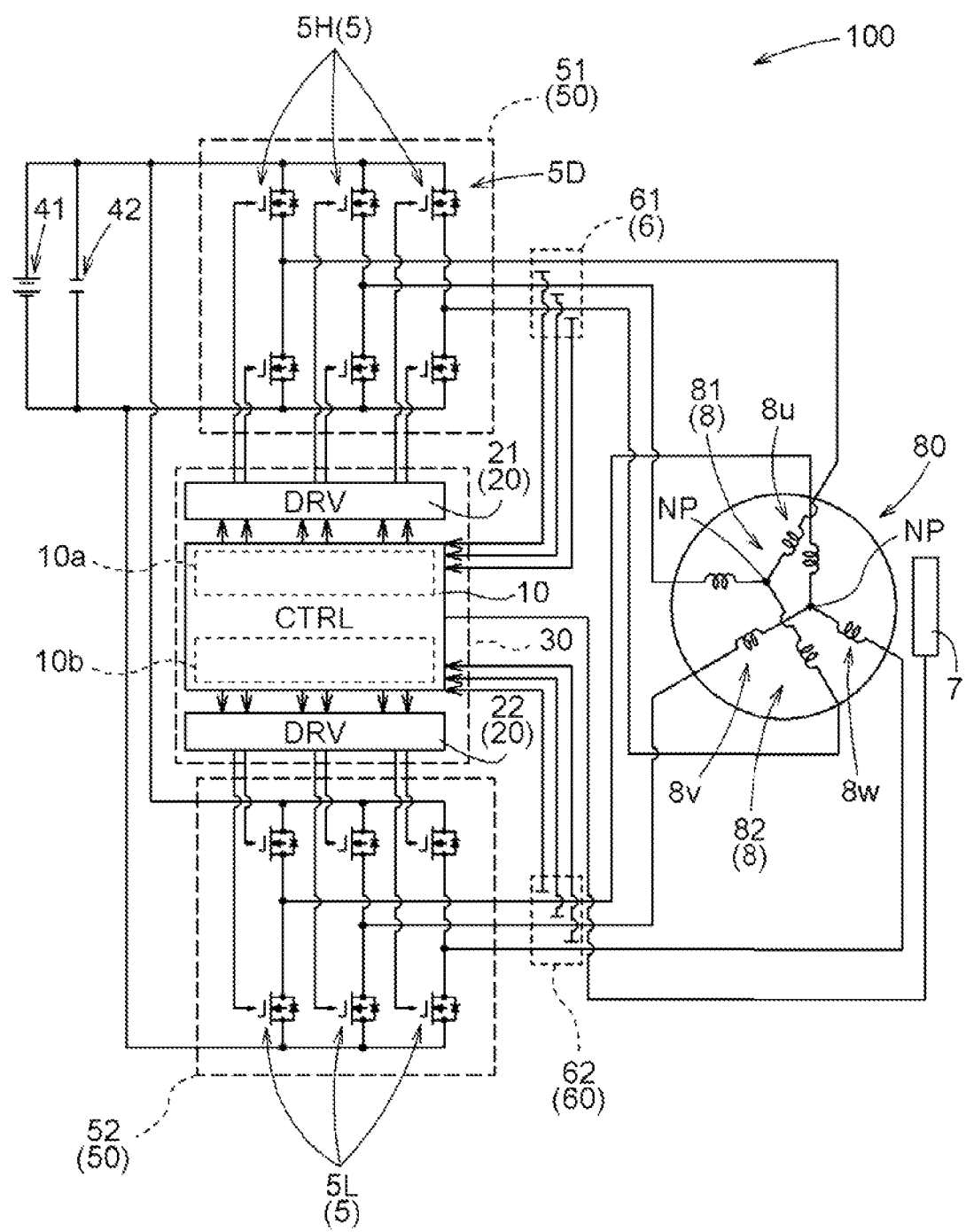
FIG. 17 is a block diagram of a rotating electrical machine control system including inverters of a comparative example.

Here, when the modulation frequency is further increased, as exemplified in FIG. 13, the distortion in alternating currents is further reduced. That is, when three-phase alternating currents are allowed to pass through only one coil set 8 using only one inverter 50 and the modulation frequency is increased, even if the feedback gain is increased by increasing the cut-off frequency, as exemplified in FIG. 13, feedback control can be converged. In this case, it is sufficient to increase the modulation frequency in one inverter 50. Thus, in a mode in which, as exemplified in FIG. 1, only the first inverter 51 uses Si-IGBTs as the switching devices 5, and Si-IGBTs are used as the switching devices 5 in the second inverter 52, an increase in cost can be suppressed. That is, as shown in FIG. 17 which is the comparative example, compared with a mode in which SiC-MOSFETs are used as the switching devices 5 in both of the first inverter 51 and the second inverter 52, the cost of the inverters 50 can be reduced.

In this case, the inverter control device 10 stops the second inverter 52 and performs switching control of the first inverter 51 to convert electric power between a direct current and alternating currents of N phases (here, three phases), or performs switching control of both of the first inverter 51 and the second inverter 52 to convert electric power between a direct current and alternating currents of 2N phases (here, six phases). In addition, it is preferred that the inverter control device 10 perform switching control of the first inverter 51 at a first switching frequency and perform switching control of the second inverter 52 at a second switching frequency lower than the first switching frequency. As is clear from a comparison between FIGS. 11 and 13, the distortion in waveforms is smaller in FIG. 13. That is, compared with a case in which, as shown in FIG. 17 which is the comparative example, the first inverter 51 and the second inverter 52 are driven by signals modulated at a high modulation frequency by forming both of the first inverter 51 and the second inverter 52 using SiC-MOSFETs, when the first inverter 51 is formed using SiC-MOSFETs and the second inverter 52 is formed using Si-IGBTs and the second inverter 52 is stopped and only the first inverter 51 is driven by a signal modulated at a high modulation frequency, the cost is low and also the distortion in waveforms is suppressed.

Figure 18:
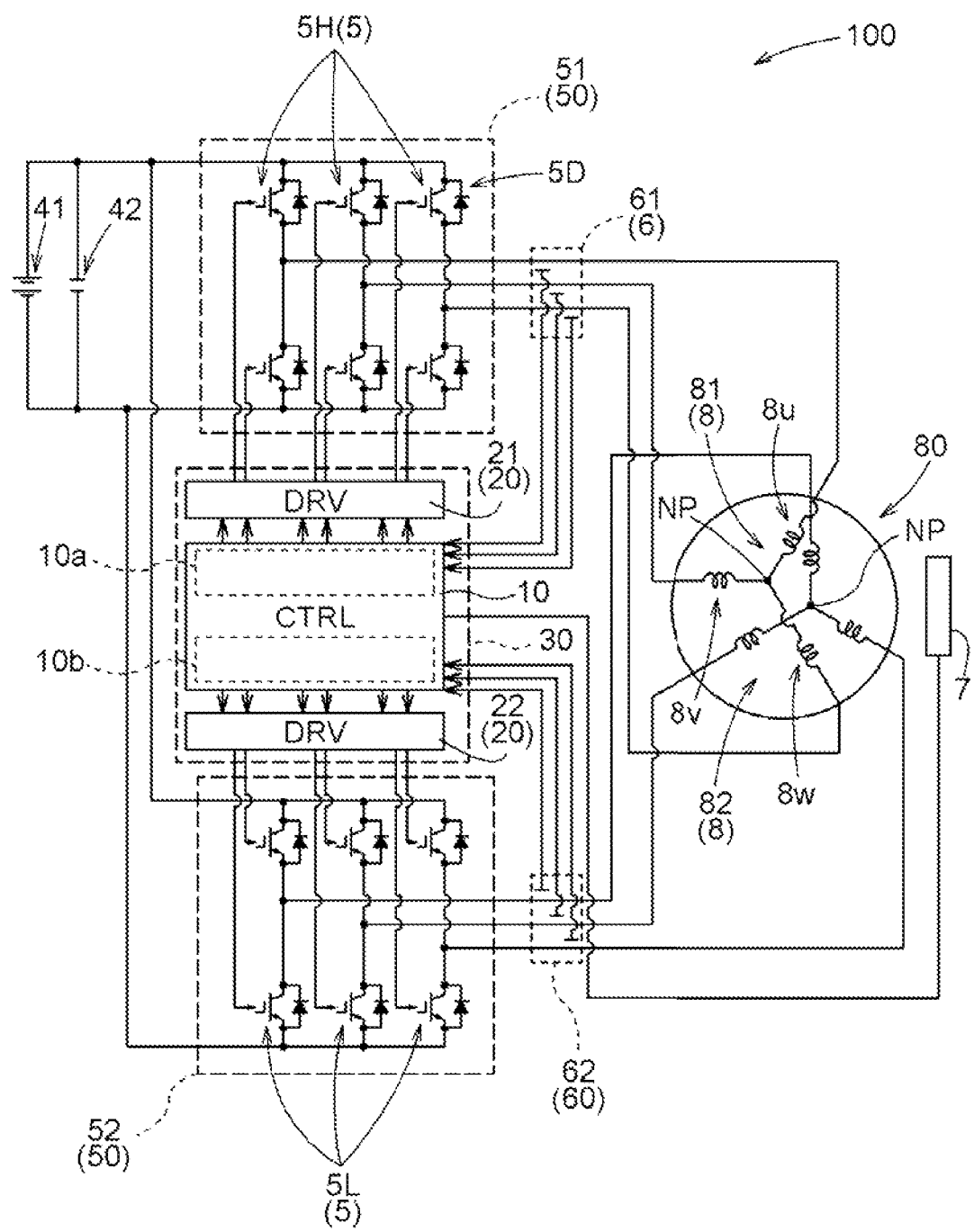
FIG. 18 is a block diagram of a rotating electrical machine control system including inverters of a comparative example.

Meanwhile, as described above with reference to FIG. 12, when three-phase alternating currents are allowed to pass through only one coil set 8 using only one inverter 50, feedback control can be converged in a state in which the feedback gain is increased by increasing the cut-off frequency, without the need to increase the modulation frequency. That is, even when, as shown in FIG. 18 which is a comparative example, both of the first inverter 51 and the second inverter 52 are formed using Si-IGBTs, it is possible to reduce the distortion in waveforms to a certain extent. However, as is clear from a comparison between FIGS. 12 and 13, by driving the first inverter 51 by a signal modulated at a higher modulation frequency, waveforms with smaller distortion can be obtained.

Meanwhile, the rotating electrical machine 80 serving as, for example, a vehicle's drive power source requires driving using various torques, e.g., starting, acceleration, going up a hill, and cruising. Particularly, starting, acceleration, going up a hill, etc., require a relatively large torque. Although the operating range of the rotating electrical machine 80 is set so as to be able to handle various operation conditions, a frequently used operating range is not an operating range that requires such a large torque. The frequently used operating range is an operating range with a relatively low torque and a relatively low rotational speed or an intermediate rotational speed. Here, for example, as exemplified in FIG. 14, for the operating range of the rotating electrical machine 80, a first range R1 with a relatively low torque and a mid-to-low speed and a second range R2 on a higher torque side than the first range R1 are set.

For example, in the first range R1 in the operating range of the rotating electrical machine 80 which is defined by the torque and rotational speed of the rotating electrical machine 80, the inverter control device 10 stops the second inverter 52 and performs switching control of the first inverter 51 to convert electric power between a direct current and alternating currents of N phases (here, three phases). On the other hand, in the second range R2 which is a range on the higher torque side than the first range R1, switching control of the first inverter 51 and the second inverter 52 is performed to convert electric power between a direct current and alternating currents of 2N phases (here, six phases).

Figure 14:
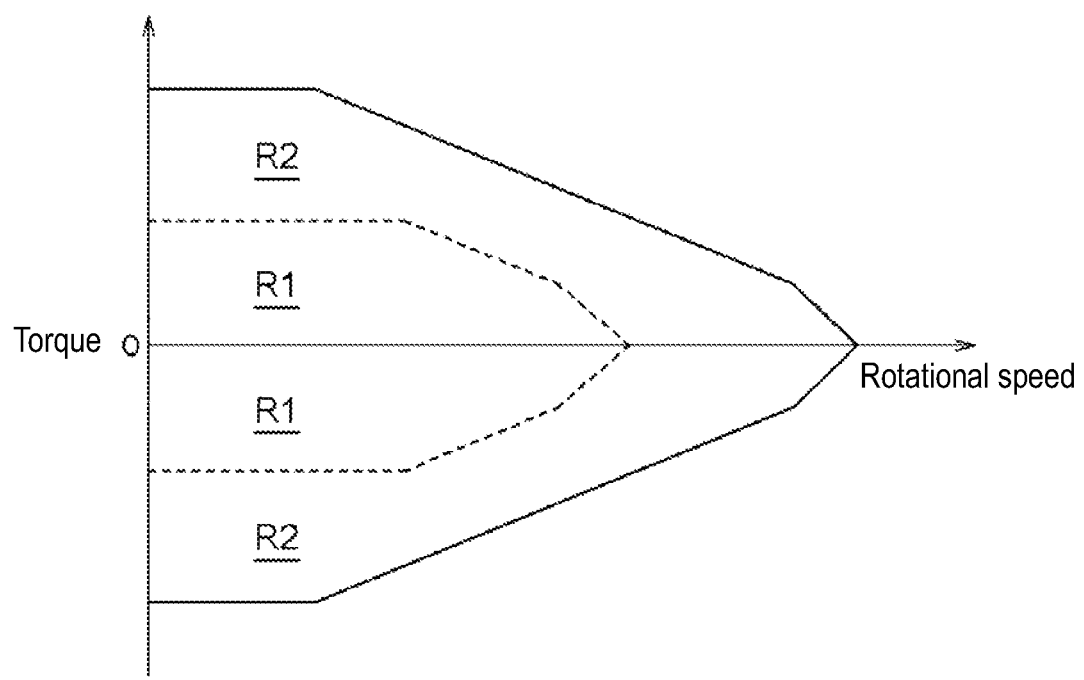
FIG. 14 is a speed-torque map of a rotating electrical machine.

Note that here, using the operating range of the rotating electrical machine 80 defined by torque and the number of revolutions such as that of FIG. 14, the first range R1 and the second range R2 in the operating range are exemplified. However, the first range R1 and the second range R2 are not limited to this mode, and for example, the first range R1 and the second range R2 may be set based on the direct-current link voltage "Vdc" and the counter-electromotive voltage.

Needless to say, the operating point of the rotating electrical machine 80 transitions even between the first range R1 and the second range R2. Thus, the inverter control device 10 switches a control mode between a state in which the second inverter 52 is stopped and switching control of the first inverter 51 is performed and a state in which switching control of the first inverter 51 and the second inverter 52 is performed. It is desirable that the rotating electrical machine 80 output the same torque before and after the switching. For example, when the operating range of the rotating electrical machine 80 transitions from the first range R1 to the second range R2, the inverter control device 10 performs switching control of the first inverter 51 and the second inverter 52 such that currents flowing through the first coil set 81 are reduced and currents corresponding to the reduced currents flow through the second coil set 82, with the output torque of the rotating electrical machine 80 maintained.

Figure 16:
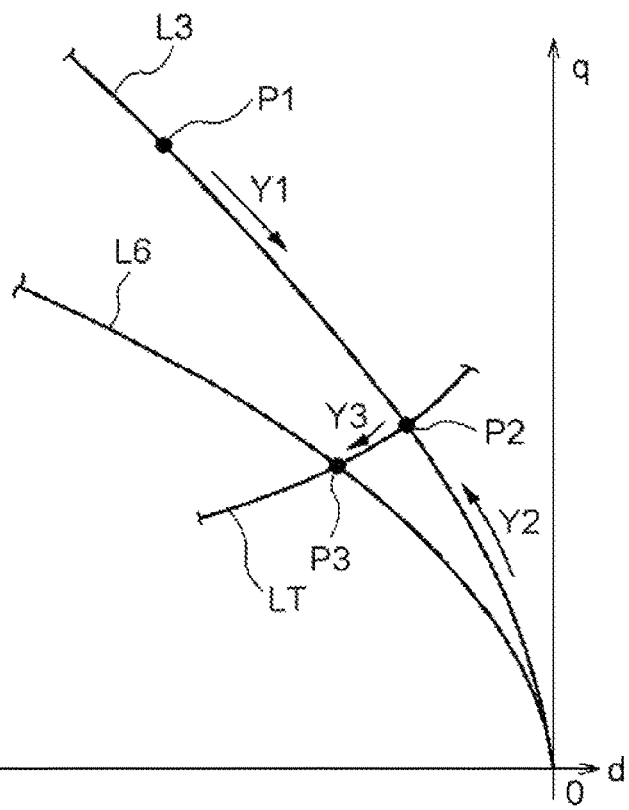
FIG. 16 is a diagram showing the operating points of the rotating electrical machine in the d-q-axis orthogonal coordinate system.

FIG. 16 shows the operating points of the rotating electrical machine 80 using currents (a d-axis current and a q-axis current) in a d-q-axis orthogonal coordinate system. Reference sign "L3" indicates a maximum efficiency line (three-phase maximum efficiency line) representing a vector locus of operating points at which torque is outputted at the highest efficiency when the rotating electrical machine 80 is driven using three-phase alternating currents by performing switching control of only the first inverter 51. Reference sign "L6" indicates a maximum efficiency line (six-phase maximum efficiency line) representing a vector locus of operating points of one inverter 5 for when torque is outputted at the highest efficiency when the rotating electrical machine 80 is driven using six-phase alternating currents by performing switching control of the first inverter 51 and the second inverter 52. Reference sign "LT" indicates an equal torque line which is a vector locus of operating points at which the same torque is outputted.

FIG. 16 exemplifies a case of a transition from a state in which the operating point of the rotating electrical machine 80 is a first operating point P1 and switching control of only the first inverter 51 is performed to a third operating point P3 which is an operating point at which switching control of the first inverter 51 and the second inverter 52 is performed. The inverter control device 10 reduces currents flowing through the first coil set 81 in an arrow Y1 direction along the three-phase maximum torque line L3, with the output torque of the rotating electrical machine 80 maintained. At the same time, the inverter control device 10 starts to allow currents corresponding to the reduced currents to flow through the second coil set 82. The currents flowing through the second coil set 82 increase in an arrow Y2 direction along the three-phase maximum torque line L3. That is, operating points defined by the currents flowing through the first coil set 81 and the second coil set 82 both approach a second operating point P2 along the three-phase maximum efficiency line L3. Since the two operating points move in an arrow Y3 direction along the three-phase maximum torque line L3 from positions that sandwich one operating point (second operating point P2), the operating points can move at high system efficiency.

When the operating points defined by the currents flowing through the first coil set 81 and the second coil set 82 both reach the second operating point P2, the inverter control device 10 allows the operating points to move along the equal torque line LT to the third operating point P3 located at a point of intersection of the equal torque line LT and the six-phase maximum efficiency line L6. Since the operating points move along the equal torque line LT, torque fluctuations do not occur, excluding control errors. Though a detailed description is omitted, the same also applies to a case in which the operating points move from the third operating point P3 to the first operating point P1. As such, the inverter control device 10 can smoothly switch the control mode between a state in which the second inverter 52 is stopped and switching control of the first inverter 51 is performed and a state in which switching control of the first inverter 51 and the second inverter 52 is performed.

At the second operating point P2 and the third operating point P3, i.e., on the equal torque line LT, currents flowing through the first coil set 81 and the second coil set 82 have the same effective value. Namely, in the second range R2, the inverter control device 10 performs switching control of the first inverter 51 and the second inverter 52 such that currents having the same effective value flow through the first coil set 81 and the second coil set 82.

Note that it is preferred that the feedback gain for the first range R1 be set to a higher value than the feedback gain for the second range R2. When currents pass through the two coil sets 8 through the two inverters 50, a disturbance is likely to occur due to the influence of mutual inductance between the two coil sets 8, and it becomes more difficult to converge control as the feedback gain increases. On the other hand, when currents pass through only one coil set 8 (the first coil set 81) through one inverter 50 (the first inverter 51), a disturbance caused by the influence of mutual inductance does not occur almost at all, and it is easy to increase the feedback gain compared with a case in which currents pass through the two coil sets 8. The convergence time decreases as the feedback gain increases. Thus, in feedback control for the first range R1 which is frequently used in the operating range of the rotating electrical machine 80, system efficiency can be improved by using feedback gain with a higher value than feedback gain used upon feedback control for the second range R2.

Details of the inverter control device 10 will be described below. As shown in FIG. 19, the inverter control device 10 is configured to include various functional parts for current feedback control, and each functional part is implemented by cooperation of hardware such as a microcomputer and software (program).

In the present embodiment, the inverter control device 10 includes a current instruction computing part 11, current control parts 12, voltage control parts 13, modulating parts 14, and three-to-two phase coordinate-transforming parts 15. The inverter control device 10 includes the first control part 10*a* whose control target is the first inverter 51 and the second control part 10*b* whose control target is the second inverter 52. There are provided two current control parts 12, two voltage control parts 13, two modulating parts 14, and two three-to-two phase coordinate-transforming parts 15, i.e., functional parts included in the first control part 10*a* (a first current control part 12*a*, a first voltage control part 13*a*, a first modulating part 14*a*, and a three-to-two phase first coordinate-transforming part 15*a*); and functional parts included in the second control part 10*b* (a second current control part 12*b*, a second voltage control part 13*b*, a second modulating part 14*b*, and a three-to-two phase second coordinate-transforming part 15*b*). In addition, the current instruction computing part 11 includes a torque instruction dividing part 110 (DIV) that divides a torque instruction T* into a first torque instruction T*$_1$ for the first control part 10*a* and a second torque instruction T*$_2$ for the second control part 10*b*; a first current instruction computing part 11*a* that computes first current instructions I*$_1$ (a first d-axis current instruction I*$_{d1}$ and a first q-axis current instruction I*$_{q1}$) based on the first torque instruction T*$_1$; and a second current instruction computing part 11*b* that computes second current instructions I*$_2$ (a second d-axis current instruction I*$_{d2}$ and a second q-axis current instruction I*$_{q2}$) based on the second torque instruction T*$_2$.

The inverter control device 10 performs current feedback control of the rotating electrical machine 80 by performing switching control of the first inverter 51 based on deviation between the first current instructions (I*$_{d1}$ and I*$_{q1}$) which are current instructions for the first coil set 81 which are set based on target torque (torque instruction T*) of the rotating electrical machine 80, and currents ($I_{d1}$ and $I_{q1}$) flowing through the first coil set 81, and performing switching control of the second inverter 52 based on deviation between the second current instructions I*$_2$ which are current instructions for the second coil set 82 which are set based on the target torque (torque instruction T*) of the rotating electrical machine 80, and currents ($I_{d2}$ and $I_{q2}$) flowing through the second coil set 82.

In the following, first, the first control part 10a will be described and then the second control part 10b will be described, but since the first control part 10a and the second control part 10b basically have the same structure, description of the same points may be omitted as appropriate. The first current control part 12a computes two-phase voltage instructions (V*$_{d1}$ and V*$_{q1}$) which are instructions for voltages to be applied to the first coil set 81, based on deviation between two-phase current instructions (I*$_{d1}$ and I*$_{q1}$) and two-phase actual currents ($I_{d1}$ and $I_{q1}$) into which actual currents (a U-phase current $i_{u1ph}$, a V-phase current $i_{v1ph}$, and a W-phase current $i_{w1ph}$) of the rotating electrical machine 80 are coordinate-transformed. The first current control part 12a includes a d-axis proportional-integral control part 121 (PI), a q-axis proportional-integral control part 122 (PI), a q-axis decoupling control part 123 (CRS), and a d-axis decoupling control part 124 (CRS).

The d-axis proportional-integral control part 121 performs computation such as that shown in the following expression (5) based on deviation between the d-axis current instruction (I*$_{d1}$) and the d-axis current ($I_{d1}$), and the q-axis proportional-integral control part 122 performs computation such as that shown in the following expression (6) based on deviation between the q-axis current instruction (MO and the q-axis current ($I_{q1}$). In expressions (5) and (6), "(P)$_{Id1}$" and "(P)$_{Iq1}$" are proportional gains and each are the product of self-inductance ($L_{d1}$ or $L_{q1}$) on the d-axis or q-axis and cut-off frequency. In addition, "(I)$_{Id1}$" and "(I)$_{Iq1}$" are the product of the combined resistance value "Ra" of the first coil set 81, a control period [seconds], and cut-off frequency. It is preferred to set a short control period and a high cut-off frequency particularly when switching control of only the first inverter 51 is performed. When switching control of both of the first inverter 51 and the second inverter 52 is performed, it is preferred to set a low cut-off frequency in order to suppress the influence of disturbance voltage caused by mutual inductance. The high cut-off frequency is on the order of a factor of 2 to 2.5 higher than the low cut-off frequency.

[Expression 5]

$$V_{d1}FB = (P)_{Id1} \cdot (I^*_{d1} - I_{d1}) + (I)_{Id1} \cdot \Sigma(I^*_{d1} - I_{d1}) \tag{5}$$

[Expression 6]

$$V_{q1}FB = (P)_{Iq1} \cdot (I^*_{q1} - I_{q1}) + (I)_{Iq1} \cdot \Sigma(I^*_{q1} - I_{q1}) \tag{6}$$

The q-axis decoupling control part 123 performs computation such as that shown in the following expression (7) based on deviation between the d-axis current instruction (I*$_{d1}$) and the d-axis current ($I_{d1}$), and the d-axis decoupling control part 124 performs computation such as that shown in the following expression (8) based on deviation between the q-axis current instruction (I*$_{q1}$) and the q-axis current ($I_{q1}$). In expression (7), "(I)$_{Idq1}$" is the product of rotational speed (angular velocity ω), d-axis self-inductance $L_{d1}$, a control period [seconds], and cut-off frequency, and in expression (8), "(I)$_{Iqd1}$" is the product of rotational speed (angular velocity ω), q-axis self-inductance $L_{q1}$, a control period [seconds], and cut-off frequency.

[Expression 7]

$$V_{q1}\text{cross} = (I)_{Idq1} \cdot \Sigma(I^*_{d1} - I_{d1}) \tag{7}$$

[Expression 8]

$$V_{q1}\text{cross} = (I)_{Idq1} \cdot \Sigma(I^*_{q1} - I_{q1}) \tag{8}$$

Figure 19:
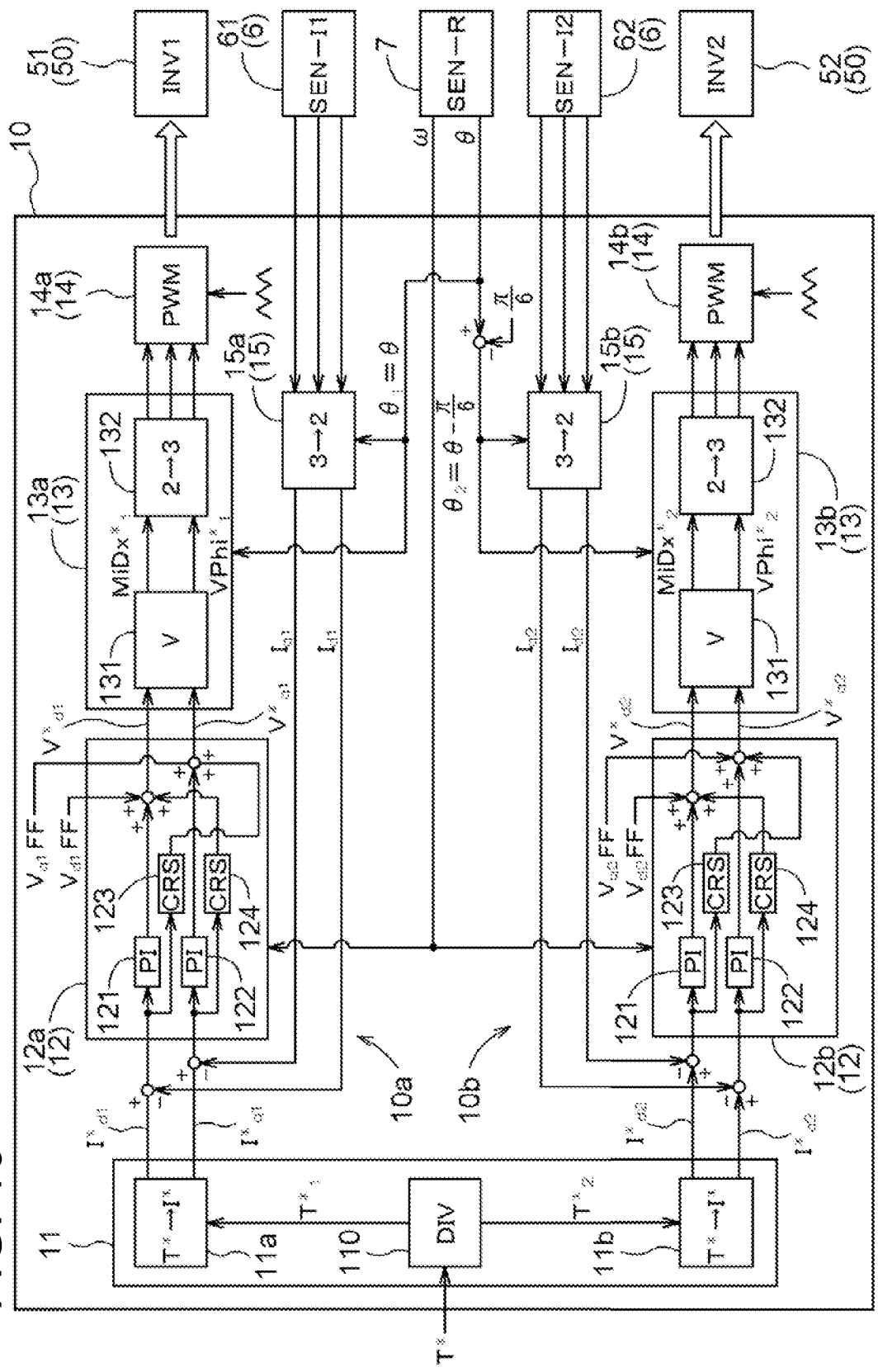
FIG. 19 is a block diagram showing an example of an inverter control device.

In addition, the inverter control device 10 includes, though not shown in FIG. 19, a feedforward computing part, and a d-axis feedforward value ($V_{d1}$FF) and a q-axis feedforward value ($V_{q1}$FF) are computed. Theoretically, the d-axis feedforward value ($V_{d1}$FF) and the q-axis feedforward value ($V_{q1}$FF) are represented by the following expressions (9) and (10).

[Expression 9]

$$V_{d1}FF = -\omega \cdot L_{q1} \cdot I^*_{q1} - \omega \cdot M_{q12} \cdot I^*_{q2} + M_{d12} \cdot \frac{dI^*_{d2}}{dt} \tag{9}$$

[Expression 10]

$$V_{q1}FF = \omega \cdot L_{d1} \cdot I^*_{d1} + \omega \cdot MI_f + \omega \cdot M_{d12} \cdot I^*_{d2} + M_{q12} \cdot \frac{dI^*_{q2}}{dt} \tag{10}$$

However, for differential terms which are the third term in expression (9) and the fourth term in expression (10), the current instructions (I*$_{d1}$ and I*$_{q1}$) cannot be differentiated, and thus, these terms are excluded, and the d-axis feedforward value ($V_{d1}$FF) and the q-axis feedforward value ($V_{q1}$FF) are computed based on the following expressions (11) and (12).

[Expression 11]

$$V_{d1}FF = -\omega \cdot L_{q1} \cdot I^*_{q1} - \omega \cdot M_{q12} \cdot I^*_{q2} \tag{11}$$

[Expression 12]

$$V_{d1}FF = \omega \cdot L_{d1} \cdot I^*_{d1} + \omega \cdot MI_f + \omega \cdot M_{d12} \cdot I^*_{q2} \tag{12}$$

As shown in the following expression (13), the first current control part 12a computes a d-axis voltage instruction (V*$_{d1}$) by adding together a result of the computation ($V_{d1}$FB) by the d-axis proportional-integral control part 121, a result of the computation ($V_{d1}$cross) by the d-axis decoupling control part 124, and the d-axis feedforward value ($V_{d1}$FF) which is computed additionally. In addition, as shown in the following expression (14), the first current control part 12a computes a d-axis voltage instruction (V*$_{q1}$) by adding together a result of the computation ($V_{q1}$FB) by the q-axis proportional-integral control part 122, a result of the computation ($V_{q1}$cross) by the q-axis decoupling control part 123, and the q-axis feedforward value ($V_{q1}$FF) which is computed additionally.

[Expression 13]

$$V^*_{d1} = V_{d1}FB + V_{d1}\text{cross} + V_{d1}FF \tag{13}$$

[Expression 14]

$$V^*_{q1} = V_{q1}FB + V_{q1}\text{cross} + V_{q1}FF \tag{14}$$

Note that coordinate transformation from the three-phase actual currents (the U-phase current $i_{u1ph}$, the V-phase current $i_{v1ph}$, and the W-phase current $i_{w1ph}$) of the first coil set 81 to the two-phase actual currents ($I_{d1}$ and $I_{q1}$) is performed by the three-to-two phase first coordinate-transforming part 15a. The three-to-two phase first coordinate-transforming part 15a performs coordinate transformation based on a first electrical angle θ1 (=θ) which is a rotational position (a magnetic pole position and an electrical angle θ) at each time point of the rotor 80r which is detected by the rotation sensor 7 (SEN-R).

The first voltage control part 13a computes three-phase voltage instructions for the first coil set 81, based on the two-phase voltage instructions ($V^*_{d1}$ and $V^*_{q1}$) in the d-q-axis orthogonal vector coordinate system. The first voltage control part 13a includes a voltage computing part 131 that computes two-phase voltages based on the direct-current link voltage "Vdc"; and a two-to-three phase coordinate-transforming part 132 that transforms the two-phase voltages into three-phase voltage instructions.

The first modulating part 14a generates switching control signals for the first inverter 51 based on each of the three-phase voltage instructions. Here, a mode is exemplified in which the first modulating part 14a generates switching control signals by pulse width modulation (PWM) based on the carrier of the first switching frequency. In the present embodiment, as shown in FIG. 1, the switching devices 5 in the first inverter 51 are SiC-MOSFETS and can perform switching at a high switching frequency compared with Si-IGBTs. Thus, it is preferred that the first switching frequency be a higher frequency (e.g., on the order of a factor of 2 to 2.5) than the second switching frequency.

Next, the second control part 10b will be described, but description of the same points as those of the first control part 10a is omitted as appropriate. The second current control part 12b computes two-phase voltage instructions ($V^*_{d2}$ and $V^*_{q2}$) which are instructions for voltages to be applied to a corresponding inverter 50, based on deviation between two-phase current instructions ($I^*_{d2}$ and $I^*_{q2}$) and two-phase actual currents ($I_{d2}$ and $I_{q2}$) into which actual currents (a U-phase current $i_{u2ph}$, a V-phase current $i_{v2ph}$, and a W-phase current $i_{w2ph}$) of the rotating electrical machine 80 are coordinate-transformed.

As shown in FIG. 19, the second current control part 12b also includes the same functional parts as the first current control part 12a. A d-axis proportional-integral control part 121 performs computation such as that shown in the following expression (15) based on deviation between the d-axis current instruction ($I^*_{d2}$) and the d-axis current ($I_{d2}$), and a q-axis proportional-integral control part 122 performs computation such as that shown in the following expression (16) based on deviation between the q-axis current instruction ($I^*_{q2}$) and the q-axis current ($I_{q2}$). In expressions (15) and (16), "$(P)_{Id2}$" and "$(P)_{Iq2}$" are proportional gains and each are the product of self-inductance ($L_{d2}$ or $L_{q2}$) on the d-axis or q-axis and cut-off frequency. In addition, "$(I)_{Id2}$" and "$(I)_{Iq2}$" are the product of the combined resistance value "Ra" of the second coil set 82, a control period [seconds], and cut-off frequency.

[Expression 15]

$$V_{d2}FB=(P)_{Id2}\cdot(I^*_{d2}-I_{d2})+(I)_{Id2}\cdot\Sigma(I^*_{d2}-I_{d2}) \quad (15)$$

[Expression 16]

$$V_{q2}FB=(P)_{Iq2}\cdot(I^*_{q2}-I_{q2})+(I)_{Iq2}\cdot\Sigma(I^*_{q2}-I_{q2}) \quad (16)$$

A q-axis decoupling control part 123 performs computation such as that shown in the following expression (17) based on deviation between the d-axis current instruction ($I^*_{d2}$) and the d-axis current ($I_{d2}$), and a d-axis decoupling control part 124 performs computation such as that shown in the following expression (18) based on deviation between the q-axis current instruction ($I^*_{q2}$) and the q-axis current ($I_{q2}$). In expression (17), "$(I)_{Idq2}$" is the product of rotational speed (angular velocity ω), d-axis self-inductance $L_{d2}$, a control period [seconds], and cut-off frequency, and in expression (18), "$(I)_{Iqd2}$" is the product of rotational speed (angular velocity ω), q-axis self-inductance $L_{q2}$, a control period [seconds], and cut-off frequency.

[Expression 17]

$$V_{q2}\text{cross}=(I)_{Idq2}\cdot\Sigma(I^*_{d2}-I_{d2}) \quad (17)$$

[Expression 18]

$$V_{d2}\text{cross}=(I)_{Idq2}\cdot\Sigma(I^*_{q2}-I_{q2}) \quad (18)$$

In addition, the inverter control device 10 includes, though not shown in FIG. 19, a feedforward computing part, and a d-axis feedforward value ($V_{d2}FF$) and a q-axis feedforward value ($V_{q2}FF$) are computed. Theoretically, the d-axis feedforward value ($V_{d2}FF$) and the q-axis feedforward value ($V_{q2}FF$) are represented by the following expressions (19) and (20).

[Expression 19]

$$V_{d2}FF = -\omega\cdot L_{q2}\cdot I^*_{q2} - \omega\cdot M_{q21}\cdot I^*_{qi} + M_{d21}\cdot\frac{dI^*_{d1}}{dt} \quad (19)$$

[Expression 20]

$$V_{q2}FF = \omega\cdot L_{d2}\cdot I^*_{d2} + \omega\cdot MI_f + \omega\cdot M_{d21}\cdot I^*_{d1} + M_{q21}\cdot\frac{dI^*_{q1}}{dt} \quad (20)$$

However, for differential terms which are the third term in expression (19) and the fourth term in expression (20), the current instructions ($I^*_{d2}$ and $I^*_{q2}$) cannot be differentiated, and thus, these terms are excluded, and the d-axis feedforward value ($V_{d2}FF$) and the q-axis feedforward value ($V_{q2}FF$) are computed based on the following expressions (21) and (22).

[Expression 21]

$$V_{d2}FF=-\omega\cdot L_{q2}\cdot I^*_{q2}-\omega\cdot M_{q21}\cdot I^*_{q1} \quad (21)$$

[Expression 22]

$$V_{q2}FF=\omega\cdot L_{d2}\cdot I^*_{d2}+\omega\cdot MI_f+\omega\cdot M_{d21}\cdot I^*_{d1} \quad (22)$$

As shown in the following expression (23), the second current control part 12b computes a d-axis voltage instruction ($V^*_{d2}$) by adding together a result of the computation ($V_{d2}FB$) by the d-axis proportional-integral control part 121, a result of the computation ($V_{d2}$cross) by the d-axis decoupling control part 124, and the d-axis feedforward value ($V_{d2}FF$) which is computed additionally. In addition, as shown in the following expression (24), the second current control part 12b computes a d-axis voltage instruction ($V^*_{q2}$) by adding together a result of the computation ($V_{q2}FB$) by the q-axis proportional-integral control part 122, a result of the computation ($V_{q2}$cross) by the q-axis decoupling control part 123, and the q-axis feedforward value ($V_{q2}FF$) which is computed additionally.

[Expression 23]

$$V^*_{d2}=V_{d2}FB+V_{d2}\text{cross}+V_{d2}FF \quad (23)$$

[Expression 24]

$$V^*_{d2} = V_{q2}FB + V_{q2}\text{cross} + V_{q2}FF \quad (24)$$

Coordinate transformation from the three-phase actual currents (the U-phase current $i_{u2ph}$, the V-phase current $i_{v2ph}$, and the W-phase current $i_{w2ph}$) of the second coil set 82 to the two-phase actual currents ($I_{d2}$ and $I_{q2}$) is performed by the three-to-two phase second coordinate-transforming part 15b. The three-to-two phase second coordinate-transforming part 15b performs coordinate transformation based on a rotational position (a magnetic pole position and an electrical angle θ) at each time point of the rotor 80r which is detected by the rotation sensor 7 (SEN-R). As described above with reference to FIG. 2, control is performed such that currents whose phases differ from each other by 30 degrees (π/6) flow through the first coil set 81 and the second coil set 82. Thus, a second electrical angle θ2 used for coordinate transformation by the three-to-two phase second coordinate-transforming part 15b differs in phase by 30 degrees (π/6) from the first electrical angle θ1 used for coordinate transformation by the three-to-two phase first coordinate-transforming part 15a. The second electrical angle θ2 is "θ−π/6" in which the phase is delayed by 30 degrees (π/6) from an electrical angle θ detected by the rotation sensor 7.

The second voltage control part 13b computes three-phase voltage instructions for the second coil set 82, based on the two-phase voltage instructions ($V^*_{d1}$ and $V^*_{q1}$) in the d-q-axis orthogonal vector coordinate system. The second voltage control part 13b includes a voltage computing part 131 that computes two-phase voltages based on the direct-current link voltage "Vdc"; and a two-to-three phase coordinate-transforming part 132 that transforms the two-phase voltages into three-phase voltage instructions.

The second modulating part 14b generates switching control signals for the second inverter 52 based on each of the three-phase voltage instructions. Here, a mode is exemplified in which the second modulating part 14b generates switching control signals by pulse width modulation based on the carrier of the second switching frequency.

In the present embodiment, as shown in FIG. 1, the switching devices 5 in the first inverter 51 are SiC-MOSFETS and can perform switching at a high switching frequency compared with Si-IGBTs. Thus, as described above, it is preferred that the first switching frequency be a higher frequency (e.g., on the order of a factor of 2 to 2.5) than the second switching frequency. In addition, the first inverter 51 is driven alone occasionally, and when the first inverter 51 is driven alone, as described above with reference to FIGS. 11 and 13, it is desirable that the switching frequency be higher.

SUMMARY OF THE EMBODIMENT

A summary of a rotating electrical machine control system (100) described above will be briefly described below.

In one aspect, a rotating electrical machine control system (100) that controls an alternating-current rotating electrical machine (80) having a first coil set (81) of an N phase (N is a natural number) and a second coil set (82) of an N phase arranged on the same stator core includes a first inverter (51) that is connected to a direct-current power supply (41) and the first coil set (81) to convert electric power between a direct current and an alternating current of an N phase; a second inverter (52) that is connected to the direct-current power supply (41) and the second coil set (82) to convert electric power between a direct current and an alternating current of an N phase; and an inverter control device (10) that generates switching control signals that individually control the first inverter (51) and the second inverter (52), and controls the first inverter (51) and the second inverter (52) such that currents of different phases flow through the first coil set (81) and the second coil set (82), and the inverter control device (10) stops the second inverter (52) and performs switching control of the first inverter (51) to convert electric power between a direct current and an alternating current of an N phase, or performs switching control of both of the first inverter (51) and the second inverter (52) to convert electric power between a direct current and alternating currents of 2N phases, and switching devices (5) included in the first inverter (51) have a shorter transition time between an off state and an on state and smaller switching loss than switching devices included in the second inverter (52).

One of the advantages of the rotating electrical machine (80) including the two coil sets (8) is that by providing the two inverters (50) for the two coil sets (8), the load on the inverters (50) is reduced, by which larger alternating currents can flow, increasing the torque of the rotating electrical machine (80). However, depending on required torque, it is also possible to allow the rotating electrical machine (80) to output the required torque using an alternating current that can be handled by one inverter (50). When the second inverter (52) is stopped and switching control of the first inverter (51) is performed, since a current is not supplied to the second coil set (82) from the second inverter (52), core loss caused by mutual inductance between the first coil set (51) and the second coil set (52) is also suppressed. On the other hand, for example, when required torque is high and alternating currents that should be handled by the two inverters (50) are required, alternating currents of 2N phases can flow through the rotating electrical machine (80), and thus, compared with a case in which an alternating current of an N phase flows through the rotating electrical machine (80), output torque can be increased. Namely, according to this configuration, it is possible to switch a control mode between control that uses one inverter (50) and control that uses the two inverters (50), as necessary. In this case, the first inverter (51) that operates alone operates at all times, but the second inverter (52) stops occasionally. When the switching devices (5) included in the first inverter (51) with a higher utilization rate are devices with small switching loss compared with the switching devices (5) included in the second inverter (52), the loss of the entire system can be reduced. In general, switching devices (5) having such small switching loss are expensive, and thus, are used only in the first inverter (51) which is one of the two inverters (50), by which an increase in the overall system cost can be suppressed. Namely, according to this configuration, a system whose control target is the alternating-current rotating electrical machine (80) including the two coil sets (8) can improve system efficiency while suppressing an increase in system cost.

In addition, it is preferred that the inverter control device (10) perform switching control of the first inverter (51) at a first switching frequency and perform switching control of the second inverter (52) at a second switching frequency lower than the first switching frequency.

In general, alternating currents with small distortion can be obtained by performing switching control of the inverters (50) at a higher switching frequency. Such distortion causes core loss, vibration, or noise, and thus, it is desirable that distortion in alternating currents be small. The switching devices (5) included in the first inverter (51) are devices having a shorter transition time between an off state and an on state and smaller switching loss than the switching devices included in the second inverter (52). Thus, compared with the switching devices included in the second inverter (52), the switching devices included in the first inverter (51) can efficiently operate even at a higher switching frequency. Thus, by performing switching control of the first inverter (51) at the first switching frequency and performing switching control of the second inverter (52) at the second switching frequency lower than the first switching frequency, system efficiency can be improved.

In addition, it is preferred that the inverter control device (10) stop the second inverter (52) and perform switching control of the first inverter (51) to convert electric power between a direct current and an alternating current of an N phase in a first range (R1) in an operating range of the rotating electrical machine (80) defined by the torque and rotational speed of the rotating electrical machine (80), and perform switching control of the first inverter (51) and the second inverter (52) to convert electric power between a direct current and alternating currents of 2N phases in a second range (R2) which is a range on a higher torque side than the first range (R1).

In general, the most frequently used range in the operating range of the rotating electrical machine (80) is often a range on a relatively low torque side. As described above, one of the advantages of the rotating electrical machine (80) including the two coil sets (8) is that by providing the two inverters (50) for the two coil sets (8), the load on the inverters (50) is reduced, by which larger alternating currents flow, increasing the torque of the rotating electrical machine (80). However, on the relatively low torque side, it is also possible to allow the rotating electrical machine (80) to output required torque using an alternating current that can be handled by one inverter (50). When the second inverter (52) is stopped and switching control of the first inverter (51) is performed, since a current is not supplied to the second coil set (82) from the second inverter (52), core loss caused by mutual inductance between the first coil set (81) and the second coil set (82) is also suppressed. According to this configuration, in the first range (R1) which is a range on the relatively low torque side in the operating range of the rotating electrical machine (80), the inverter control device (10) stops the second inverter (52) and performs switching control of the first inverter (51) to convert electric power between a direct current and an alternating current of an N phase. That is, since core loss is reduced in the first range (R1) which is considered to be most frequently used in the operating range of the rotating electrical machine (80), system efficiency can be improved. In the second range (R2) on a relatively high torque side, the inverter control device (10) performs switching control of the first inverter (51) and the second inverter (52) to convert electric power between a direct current and alternating currents of 2N phases, and thus, torque required for the rotating electrical machine (80) can be outputted. In this case, core loss caused by mutual inductance occurs. However, since the operation frequency of the rotating electrical machine (80) in the second range (R2) is low compared with the operation frequency of the rotating electrical machine (80) in the first range (R1), the influence of reducing system efficiency is small compared with the first range (R1).

Here, it is preferred that the inverter control device (10) control the first inverter (51) and the second inverter (52) such that currents whose phases differ from each other by ($\pi/2N$) flow through the first coil set (81) and the second coil set (82).

According to this configuration, the inverter control device (10) can allow electric power to be appropriately converted between a direct current and alternating currents of 2N phases by individually performing switching control of the first inverter (51) and the second inverter (52).

In addition, it is preferred that the first range (R1) and the second range (R2) be set based on the torque and rotational speed of the rotating electrical machine (80), or set based on a voltage on a direct-current side of the first inverter (51) and the second inverter (52) and a counter-electromotive voltage of the rotating electrical machine (80).

The operating range of the rotating electrical machine (80) can be defined by a relationship between torque and rotational speed, a relationship between a voltage on the direct-current side of the inverters (50) and a counter-electromotive voltage, etc. In such an operating range, an operating range with a relatively high use frequency and an operating range with a low use frequency can be identified. Thus, when the first range (R1) and the second range (R2) are set as described above, a control mode in which electric power is converted using both of the first inverter (51) and the second inverter (52) and a control mode in which the second inverter (52) is stopped and electric power is converted using only the first inverter (51) can be appropriately selected.

In addition, it is preferred that when the operating range of the rotating electrical machine (80) transitions from the first range (R1) to the second range (R2), the inverter control device (10) perform switching control of the first inverter (51) and the second inverter (52) such that a current flowing through the first coil set (81) is reduced and a current corresponding to the reduced current flows through the second coil set (82), with output torque of the rotating electrical machine (80) maintained.

Optimal operating conditions, of course, differ between when the rotating electrical machine (80) is controlled by allowing currents to pass through the two coil sets (8) and when the rotating electrical machine (80) is controlled by allowing a current to pass through only one coil set (8). Hence, upon switching a control mode from a state in which a current passes through only one coil set (8) to a state in which currents pass through the two coil sets (8), even if output torque is the same, there is a need to change the operating conditions of each inverter (50), and when the control mode is suddenly switched, there is a possibility of occurrence of torque fluctuations. According to this configuration, by performing control such that a difference between currents flowing through the two coil sets (8) is reduced, the control mode can be smoothly switched.

In addition, it is preferred that in the second range (R2), the inverter control device (10) perform switching control of the first inverter (51) and the second inverter (52) such that currents having the same effective value flow through the first coil set (81) and the second coil set (82).

According to this configuration, since stable alternating currents of 2N phases can be obtained, the rotating electrical machine (80) can be appropriately driven.

In addition, it is preferred that the inverter control device (10) perform current feedback control of the rotating electrical machine (80) by performing switching control of the first inverter (51) based on deviation between first current instructions ($I^*_{d1}$ and $I^*_{q1}$) which are current instructions for the first coil set (81) which are set based on target torque ($T^*$) of the rotating electrical machine (80), and currents ($I_{d1}$ and $I_{q1}$) flowing through the first coil set (81), and performing switching control of the second inverter (52) based on deviation between second current instructions ($I^*_{d2}$ and $I^*_{q2}$) which are current instructions for the second coil set (82) which are set based on the target torque (T*) of the rotating electrical machine (80), and currents ($I_{d2}$ and $I_{q2}$) flowing through the second coil set (82), and feedback gain for the first range (R1) be set to a higher value than feedback gain for the second range (R2).

When currents pass through the two coil sets (8) through the two inverters (50), a disturbance is likely to occur due to the influence of mutual inductance between the two coil sets (8), and it becomes more difficult to converge control as the feedback gain increases. On the other hand, when a current passes through only one coil set (8) through one inverter (50), a disturbance caused by the influence of mutual inductance is little, and it is easy to increase the feedback gain compared with a case in which currents pass through the two coil sets (8). The convergence time decreases as the feedback gain increases. Thus, in feedback control for the first range (R1) which is frequently used in the operating range of the rotating electrical machine (80), system efficiency can be improved by using feedback gain with a higher value than feedback gain used upon feedback control for the second range (R2).

REFERENCE SIGNS LIST

5: Switching device, 10: Inverter control device, 41: Direct-current power supply, 51: First inverter, 52: Second inverter, 80: Rotating electrical machine, 81: First coil set, 82: Second coil set, 100: Rotating electrical machine control system, $I^*_{d1}, I^*_{q1}$: First current instruction, $I^*_{d2}, I^*_{q2}$: Second current instruction, $I_{d1}, I_{q1}$: Current flowing through the first coil set, $I_{d2}, I_{q2}$: Current flowing through the second coil set, R1: First range, R2: Second range, and T*: Target torque

The invention claimed is:

1. A rotating electrical machine control system that controls an alternating-current rotating electrical machine having a first coil set of an N phase (N is a natural number) and a second coil set of an N phase arranged on a same stator core, the rotating electrical machine control system comprising:
    a first inverter that is connected to a direct-current power supply and the first coil set to convert electric power between a direct current and an alternating current of an N phase;
    a second inverter that is connected to the direct-current power supply and the second coil set to convert electric power between a direct current and an alternating current of an N phase; and
    an inverter control device that generates switching control signals that individually control the first inverter and the second inverter, and controls the first inverter and the second inverter such that currents of different phases flow through the first coil set and the second coil set,
    wherein
    the inverter control device
        stops the second inverter and performs switching control of the first inverter to convert electric power between a direct current and an alternating current of an N phase, or
        performs switching control of both of the first inverter and the second inverter to convert electric power between a direct current and alternating currents of 2N phases, and
    switching devices included in the first inverter have a shorter transition time between an off state and an on state and smaller switching loss than switching devices included in the second inverter.

2. The rotating electrical machine control system according to claim 1, wherein the inverter control device performs switching control of the first inverter at a first switching frequency and performs switching control of the second inverter at a second switching frequency lower than the first switching frequency.

3. The rotating electrical machine control system according to claim 1, wherein the inverter control device
    stops the second inverter and performs switching control of the first inverter to convert electric power between a direct current and an alternating current of an N phase in a first range in an operating range of the rotating electrical machine defined by torque and rotational speed of the rotating electrical machine, and
    performs switching control of the first inverter and the second inverter to convert electric power between a direct current and alternating currents of 2N phases in a second range, the second range being a range on a higher torque side than the first range.

4. The rotating electrical machine control system according to claim 3, wherein the inverter control device controls the first inverter and the second inverter such that currents whose phases differ from each other by ($\pi/2N$) flow through the first coil set and the second coil set.

5. The rotating electrical machine control system according to claim 3, wherein the first range and the second range are set based on torque and rotational speed of the rotating electrical machine, or set based on a voltage on a direct-current side of the first inverter and the second inverter and a counter-electromotive voltage of the rotating electrical machine.

6. The rotating electrical machine control system according to claim 3, wherein when an operating range of the rotating electrical machine transitions from the first range to the second range, the inverter control device perform switching control of the first inverter and the second inverter such that a current flowing through the first coil set is reduced and a current corresponding to the reduced current flows through the second coil set, with output torque of the rotating electrical machine maintained.

7. The rotating electrical machine control system according to claim 3, wherein in the second range, the inverter control device performs switching control of the first inverter and the second inverter such that currents having a same effective value flow through the first coil set and the second coil set.

8. The rotating electrical machine control system according to claim 3, wherein
    the inverter control device performs current feedback control of the rotating electrical machine by performing switching control of the first inverter based on deviation between first current instructions and currents flowing through the first coil set, and performing switching control of the second inverter based on deviation between second current instructions and currents flowing through the second coil set, the first current instructions being current instructions for the first coil set set based on target torque of the rotating electrical machine, and the second current instructions being current instructions for the second coil set set based on the target torque of the rotating electrical machine, and feedback gain for the first range is set to a higher value than feedback gain for the second range.

* * * * *